United States Patent
Komma et al.

(10) Patent No.: US 8,451,708 B2
(45) Date of Patent: May 28, 2013

(54) MANUFACTURING METHOD FOR OPTICAL RECORDING MEDIUM, OPTICAL RECORDING MEDIUM, OPTICAL INFORMATION DEVICE, AND INFORMATION REPRODUCING METHOD

(75) Inventors: Yoshiaki Komma, Osaka (JP); Joji Anzai, Osaka (JP); Masahiko Tsukuda, Osaka (JP); Yasumori Hino, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/461,070

(22) Filed: May 1, 2012

(65) Prior Publication Data

US 2012/0213044 A1 Aug. 23, 2012

Related U.S. Application Data

(62) Division of application No. 13/001,192, filed as application No. PCT/JP2010/002710 on Apr. 14, 2010, now Pat. No. 8,189,452.

(30) Foreign Application Priority Data

Aug. 24, 2009 (JP) ................. 2009-193593

(51) Int. Cl.
*G11B 3/70* (2006.01)
*G11B 5/84* (2006.01)
*G11B 7/26* (2006.01)
*B32B 3/02* (2006.01)

(52) U.S. Cl.
USPC ........ 369/283; 369/273; 369/275.5; 369/284; 369/285; 369/94; 428/64.4; 428/64.6; 428/64.9

(58) Field of Classification Search
USPC .............. 369/100, 283, 273, 275.5, 284, 285, 369/286, 94; 428/64.4, 64.6, 64.9
See application file for complete search history.

(56) References Cited

U.S. PATENT DOCUMENTS

| | | | |
|---|---|---|---|
| 6,954,417 B2 | 10/2005 | Komma et al. | |
| 2002/0027842 A1 | 3/2002 | Komma et al. | |

(Continued)

FOREIGN PATENT DOCUMENTS

| | | |
|---|---|---|
| JP | 2001-155380 | 6/2001 |
| JP | 2004-213885 | 7/2004 |
| JP | 2004-259439 | 9/2004 |
| JP | 2004-288371 | 10/2004 |
| JP | 2006-73053 | 3/2006 |
| JP | 2008-117513 | 5/2008 |
| JP | 2008-226460 | 9/2008 |
| WO | 2008/015974 | 2/2008 |

OTHER PUBLICATIONS

International Search Report issued May 25, 2010 in International (PCT) Application No. PCT/JP2010/002710.
U.S. Office Action issued Aug. 5, 2011 in U.S. Appl. No. 12/760,828.

*Primary Examiner* — Aneeta Yodichkas
(74) *Attorney, Agent, or Firm* — Wenderoth Lind & Ponack, L.L.P.

(57) ABSTRACT

Shape-wise thicknesses of a cover layer and first through (N−1)th intermediate layers of an optical recording medium having refractive indexes nr1, nr2 are converted into thicknesses t1, t2 of the respective layers having a predetermined refractive index which makes a divergent amount equal to a divergent amount of a light beam resulting from the thicknesses tr1, tr2, a difference DFF between the sum of a thickness "ti" through a thickness "tj", and the sum of a thickness "tk" through a thickness "tm" is set to 1 μm or more (where i, j, k, and m are each any positive integer satisfying i≦j<k≦m≦N), and the thicknesses t1, t2 are calculated by products of a function f(n) expressed by the following formula (1), and the thicknesses tr1, tr2:

$$f(n) = -1.088n^3 + 6.1027n^2 - 12.042n + 9.1007 \qquad (1)$$

in the formula (1), n=nr1, nr2, . . . , and nrN.

3 Claims, 14 Drawing Sheets

U.S. PATENT DOCUMENTS

| | | |
|---|---|---|
| 2002/0176971 A1 | 11/2002 | Ohsawa et al. |
| 2004/0265532 A1 | 12/2004 | Sasa et al. |
| 2005/0079390 A1 | 4/2005 | Habuta et al. |
| 2005/0157614 A1 | 7/2005 | Ichimura et al. |
| 2006/0062133 A1 | 3/2006 | Tsukagoshi et al. |
| 2008/0109837 A1 | 5/2008 | Anzai et al. |
| 2009/0303864 A1 | 12/2009 | Nagata et al. |
| 2010/0118685 A1* | 5/2010 | Komma et al. .......... 369/112.23 |
| 2011/0051585 A1* | 3/2011 | Komma et al. ................ 369/100 |
| 2011/0076436 A1 | 3/2011 | Inoue et al. |
| 2011/0170394 A1 | 7/2011 | Komma et al. |

* cited by examiner

MANUFACTURING METHOD FOR OPTICAL RECORDING MEDIUM, OPTICAL RECORDING MEDIUM, OPTICAL INFORMATION DEVICE, AND INFORMATION REPRODUCING METHOD

This application is a Divisional of U.S. application Ser. No. 13/001,192, filed Dec. 23, 2010 now U.S. Pat. No. 8,189,452, which is a national stage application of International Application No. PCT/JP2010/002710, filed Apr. 14, 2010.

BACKGROUND OF THE INVENTION

1. Technical Field

The present invention relates to an optical recording medium for information recording or reproducing by irradiated light, a manufacturing method for the optical recording medium, an optical information device for recording or reproducing information with respect to the optical recording medium, and an information reproducing method for reproducing information from the optical recording medium; and more particularly to an interlayer structure of an optical recording medium having three or more information recording surfaces.

2. Background Art

There are known optical discs called as DVD or BD (Blu-ray disc), as examples of the commercially available high-density and large-capacity optical information recording media. In recent years, the optical discs have become widely used as recording media for recording images, music, and computer-readable data. There also has been proposed an optical disc having plural recording layers, as disclosed in Patent Literature 1 and Patent literature 2, to further increase the recording capacity.

FIG. 14 is a diagram showing an arrangement of a conventional optical recording medium and optical head device. An optical recording medium 401 includes a first information recording surface 401a closest to a surface 401z of the optical recording medium 401, a second information recording surface 401b second closest to the surface 401z of the optical recording medium 401, a third information recording surface 401c third closest to the surface 401z of the optical recording medium 401, and a fourth information recording surface 401d farthest from the surface 401z of the optical recording medium 401.

A divergent beam 70 emitted from a light source 1 is transmitted through a collimator lens 53, and incident into a polarized beam splitter 52. The beam 70 incident into the polarized beam splitter 52 is transmitted through the polarized beam splitter 52, and converted into circularly polarized light while being transmitted through a quarter wavelength plate 54. Thereafter, the beam 70 is converted into a convergent beam through an objective lens 56, transmitted through a transparent substrate of the optical recording medium 401, and collected on one of the first information recording surface 401a, the second information recording surface 401b, the third information recording surface 401c, and the fourth information recording surface 401d formed in the interior of the optical recording medium 401.

The objective lens 56 is so designed as to make a spherical aberration zero at an intermediate depth position between the first information recording surface 401a and the fourth information recording surface 401d. A spherical aberration corrector 93 shifts the position of the collimator lens 53 in an optical axis direction. Thereby, spherical aberration resulting from collecting light on the first through the fourth information recording surfaces 401a through 401d is removed.

An aperture 55 restricts the opening of the objective lens 56, and sets the numerical aperture NA of the objective lens 56 to 0.85. The beam 70 reflected on the fourth information recording surface 401d is transmitted through the objective lens 56 and the quarter wavelength plate 54, converted into linearly polarized light along an optical path displaced by 90 degrees with respect to the outward path, and then reflected on the polarized beam splitter 52. The beam 70 reflected on the polarized beam splitter 52 is converted into convergent light while being transmitted through a light collecting lens 59, and incident into a photodetector 320 through a cylindrical lens 57. Astigmatism is imparted to the beam 70 while the beam 70 is transmitted through the cylindrical lens 57.

The photodetector 320 has unillustrated four light receiving sections. Each of the light receiving sections outputs a current signal depending on a received light amount. A focus error (hereinafter, called as FE) signal by an astigmatism method, a tracking error (hereinafter, called as TE) signal by a push-pull method, and an information (hereinafter called as RF) signal recorded in the optical recording medium 401 are generated, based on the current signals. The FE signal and the TE signal are amplified to an intended level, subjected to phase compensation, and then supplied to actuators 91 and 92, whereby focus control and tracking control are performed.

In this example, the following problem occurs, in the case where the thickness t1 between the surface 401z of the optical recording medium 401 and the first information recording surface 401a, the thickness t2 between the first information recording surface 401a and the second information recording surface 401b, the thickness t3 between the second information recording surface 401b and the third information recording surface 401c, and the thickness t4 between the third information recording surface 401c and the fourth information recording surface 401d are equal to each other.

For instance, in the case where the beam 70 is collected on the fourth information recording surface 401d to record or reproduce information on or from the fourth information recording surface 401d, a part of the beam 70 is reflected on the third information recording surface 401c. The distance from the third information recording surface 401c to the fourth information recording surface 401d, and the distance from the third information recording surface 401c to the second information recording surface 401b are equal to each other. Accordingly, the part of the beam 70 reflected on the third information recording surface 401c forms an image on a backside of the second information recording surface 401b, and reflected light from the backside of the second information surface 401b is reflected on the third information recording surface 401c. As a result, the light reflected on the third information recording surface 401c, the backside of the second information recording surface 401b, and the third information recording surface 401c may be mixed with reflected light from the fourth information recording surface 401d to be read.

Further, the distance from the second information recording surface 401b to the fourth information recording surface 401d, and the distance from the second information recording surface 401b to the surface 401z of the optical recording medium 401 are equal to each other. Accordingly, a part of the beam 70 reflected on the second information recording surface 401b forms an image on the backside of the surface 401z of the optical recording medium 401, and reflected light from the backside of the surface 401z is reflected on the second information recording surface 401b. As a result, the light reflected on the second information recording surface 401b, the backside of the surface 401z, and the second information recording surface 401b may be mixed with reflected light from the fourth information recording surface 401d to be read.

As described above, there is a problem that reflected light from the fourth information recording surface 401d to be read is superimposed and mixed with reflected light which forms an image on the backside of the other surface, with the result that information recording/reproducing is obstructed. Light containing reflected light which forms an image on the backside of the other surface has a high coherence, and forms a brightness/darkness distribution on a light receiving element by coherence. Since the brightness/darkness distribution is varied depending on a change in phase difference with respect to reflected light from the other surface, resulting from a small thickness variation of an intermediate layer in an in-plane direction of an optical disc, the quality of a servo signal and a reproduction signal may be considerably deteriorated. Hereinafter, the above problem is called as a back focus problem in the specification.

In order to prevent the back focus problem, Patent literature 1 discloses a method, wherein the interlayer distance between the information recording surfaces is gradually increased in the order from the surface 401z of the optical recording medium 401 so that a part of the beam 70 may not form an image on the backside of the second information recording surface 401b and the backside of the surface 401z simultaneously when the beam 70 is collected on the fourth information recording surface 401d to be read. The thicknesses t1 through t4 each has a production variation of ±10 μm. It is necessary to set the thicknesses t1 through t4 to different values from each other, also in a case where the thicknesses t1 through t4 are varied. In view of this, a difference in the thicknesses t1 through t4 is set to e.g. 20 μm. In this example, the thicknesses t1 through t4 are respectively set to 40 μm, 60 μm, 80 μm, and 100 μm, and the total interlayer thickness t(=t2+t3+t4) from the first information recording surface 401a to the fourth information recording layer 401d is set to 240 μm.

In the case where the thickness of a cover layer from the surface 401z to the first information recording surface 401a, and the thickness from the fourth information recording surface 401d to the first information recording surface 401a are equal to each other, light reflected on the fourth information recording surface 401d is focused on the surface 401z, and reflected on the surface 401z. The light reflected on the surface 401z is reflected on the fourth information recording surface 401d, and guided to the photodetector 320. A light flux which forms an image on the backside of the surface 401z does not have information relating to pits or marks, unlike a light flux which forms an image on the backside of the other information recording surface. However, in the case where the number of information recording surfaces is large, the light amount of light returning from the information recording surfaces is reduced, and the reflectance of the surface 401z is relatively increased. As a result, coherence between a light flux reflected on the backside of the surface 401z, and a light flux reflected on a targeted information recording surface to be recorded or reproduced is generated in the similar manner as in the case of a light flux reflected on the backside of the other information recording surfaces, which may considerably deteriorate the quality of a servo signal and a reproduction signal.

In view of the above problem, Patent literature 2 proposes a distance between information recording layers (information recording surfaces) of an optical disc. Patent literature 2 discloses the following structure.

An optical recording medium has four information recording surfaces, wherein the first through the fourth information recording surfaces are defined in the order from a side closest to a surface of the optical recording medium. The distance from the medium surface to the first information recording surface is set to 47 μm or less. The thicknesses of intermediate layers between the first through the fourth information recording surfaces are combination of a range from 11 to 15 μm, a range from 16 to 21 μm, and a range of 22 μm or more. The distance from the medium surface to the fourth information recording surface is set to 100 μm. The distance from the medium surface to the first information recording surface is set to 47 μm or less, and the distance from the medium surface to the fourth information recording surface is set to 100 μm.

An optical disc system is adapted to detect light incident from a medium surface and reflected on an information recording surface. Accordingly, a refractive index of a transparent material constituting a transparent member from the medium surface where light is transmitted to the information recording surface also affects the quality of a servo signal and a reproduction signal. However, there is no consideration and description about the refractive index in the disc structures disclosed in Patent literature 1 and Patent literature 2. Thus, both of the publications do not consider an influence of a refractive index of a transparent material on the quality of a servo signal and a reproduction signal.

CITATION LIST

Patent Literature

Patent literature 1: JP 2001-155380A
Patent literature 2: JP 2008-117513A

SUMMARY OF INVENTION

In view of the above, an object of the invention is to provide an optical recording medium manufacturing method, an optical recording medium, an optical information device, and an information reproducing method that enable to improve the quality of a servo signal and a reproduction signal.

A manufacturing method for an optical recording medium according to an aspect of the invention is a manufacturing method for an optical recording medium having (N−1) (where N is a positive integer of 4 or more) information recording surfaces, wherein, assuming that shape-wise thicknesses of a cover layer and first through (N−1)-th intermediate layers of the optical recording medium having refractive indexes nr1, nr2, ..., and nrN are respectively tr1, tr2, ..., and trN in the order from a surface of the optical recording medium where light is incident, the thicknesses tr1, tr2, ..., and trN are converted into thicknesses t1, t2, ..., and tN of layers having a predetermined refractive index "no" which makes a divergent amount equal to a divergent amount of a light beam resulting from the thicknesses tr1, tr2, ..., and trN; a difference DFF between the sum of a thickness "ti" through a thickness "tj", and the sum of a thickness "tk" through a thickness "tm" is set to 1 μm or more (where i, j, k, and m are each any positive integer satisfying i≦j<k≦m≦N); and the thicknesses t1, t2, ..., and tN are calculated by products of a function f(n) expressed by the following formula (1), and the thicknesses tr1, tr2, ..., and trN:

$$f(n) = -1.088n^3 + 6.1027n^2 - 12.042n + 9.1007 \quad (1)$$

in the formula (1), n=nr1, nr2, ..., and nrN.

In the above arrangement, assuming that shape-wise thicknesses of a cover layer and first through (N−1)-th intermediate layers of an optical recording medium having refractive indexes nr1, nr2, . . . , and nrN are respectively tr1, tr2, . . . , and trN in the order from a surface of the optical recording medium where light is incident, the thicknesses tr1, tr2, . . . , and trN are converted into thicknesses t1, t2, . . . , and tN of layers having a predetermined refractive index "no" which makes a divergent amount equal to a divergent amount of a light beam resulting from the thicknesses tr1, tr2, . . . , and trN. Further, a difference DFF between the sum of a thickness "ti" through a thickness "tj", and the sum of a thickness "tk" through a thickness "tm" is set to 1 µm or more (where i, j, k, and m are each any positive integer satisfying i≦j<k≦m≦N). Furthermore, the thicknesses t1, t2, . . . , and tN are calculated by products of the function f(n) expressed by the above-described formula (1), and the thicknesses tr1, tr2, . . . , and trN.

According to the invention, since the difference DFF between the sum of the thickness "ti" through the thickness "tj", and the sum of the thickness "tk" through the thickness "tm" is set to 1 µm or more, it is possible to prevent light from forming an image on the backside of the surface of the optical recording medium, and suppress coherence between reflected light from the information recording surfaces to thereby improve the quality of a servo signal and a reproduction signal. Further, since the distance between the surface of the optical recording medium and the information recording surface closest to the surface of the optical recording medium can be set to a large value, deterioration of a reproduction signal in the case where there is a damage or a smear on the surface of the optical recording medium can be suppressed.

The objects, characteristics and advantages of the present invention will be more apparent after reading the following detailed description along with the accompanying drawings.

DESCRIPTION OF THE INVENTION

In the following, an embodiment of the invention is described referring to the accompanying drawings. The following embodiment is merely an example embodying the invention, and does not limit the technical scope of the invention.

Figure 1:
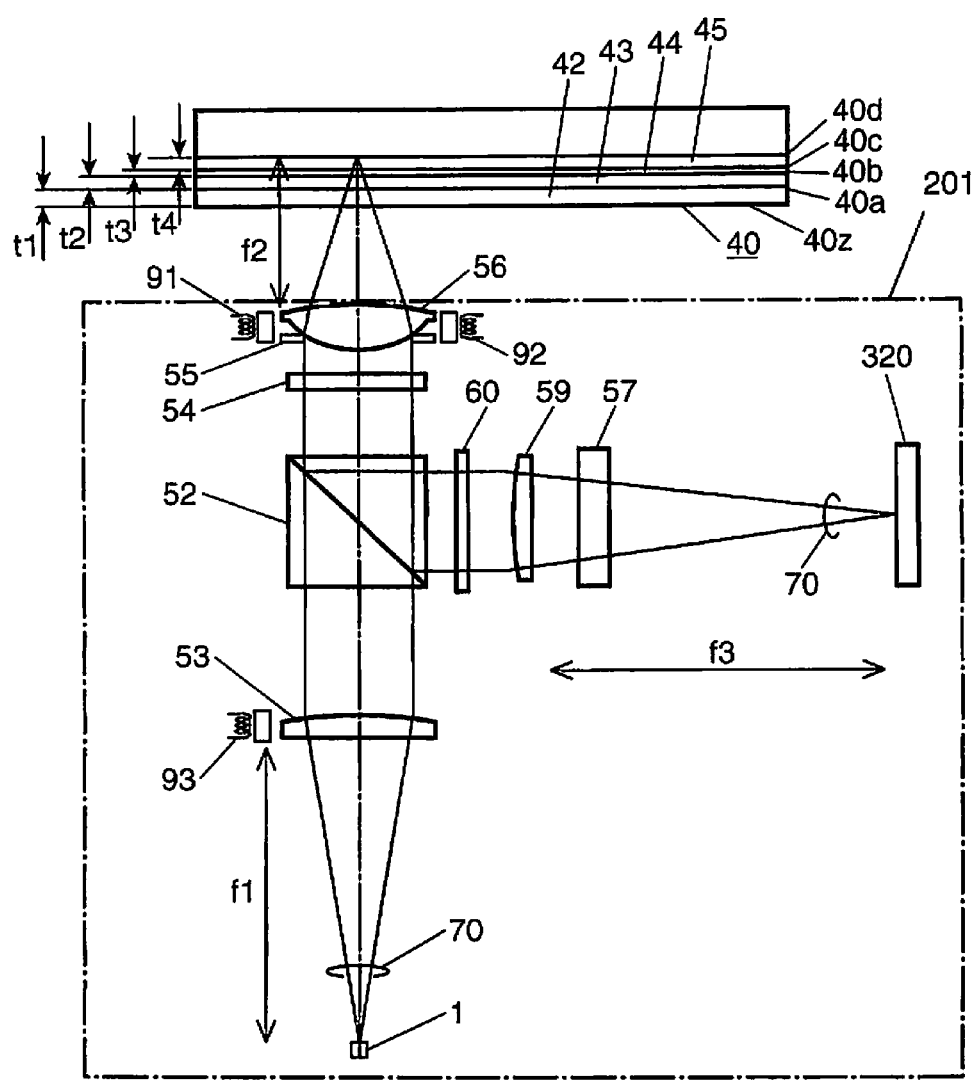
FIG. 1 is a diagram showing a schematic arrangement of an optical recording medium embodying the invention, and an optical head device.
Figure 2:
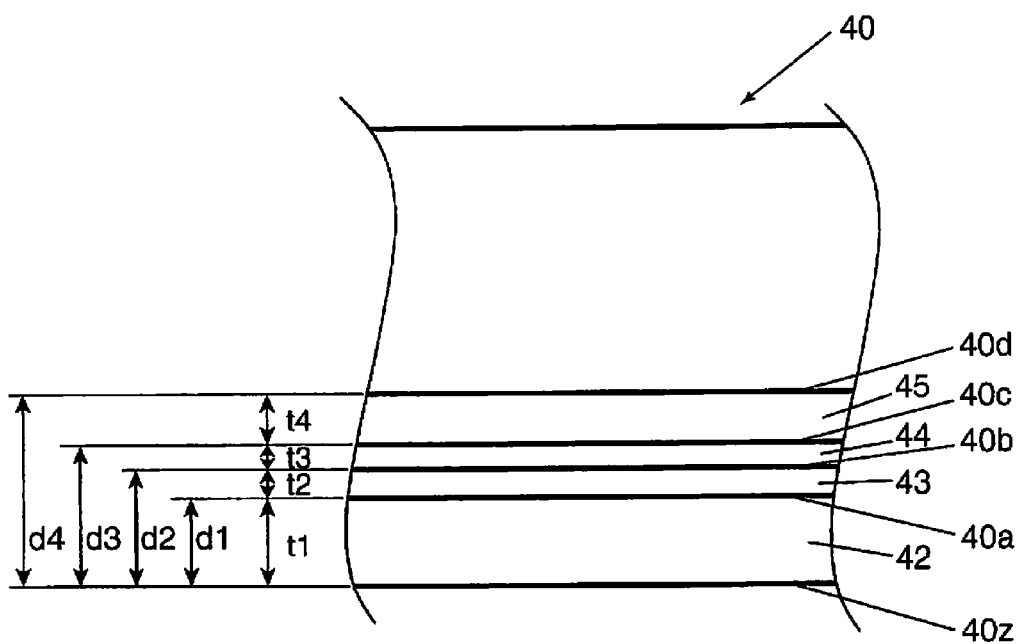
FIG. 2 is a diagram showing a layer structure of the optical recording medium in the embodiment of the invention.

Firstly, an optical recording medium embodying the invention is described referring to FIGS. 1 and 2.

Figure 14:
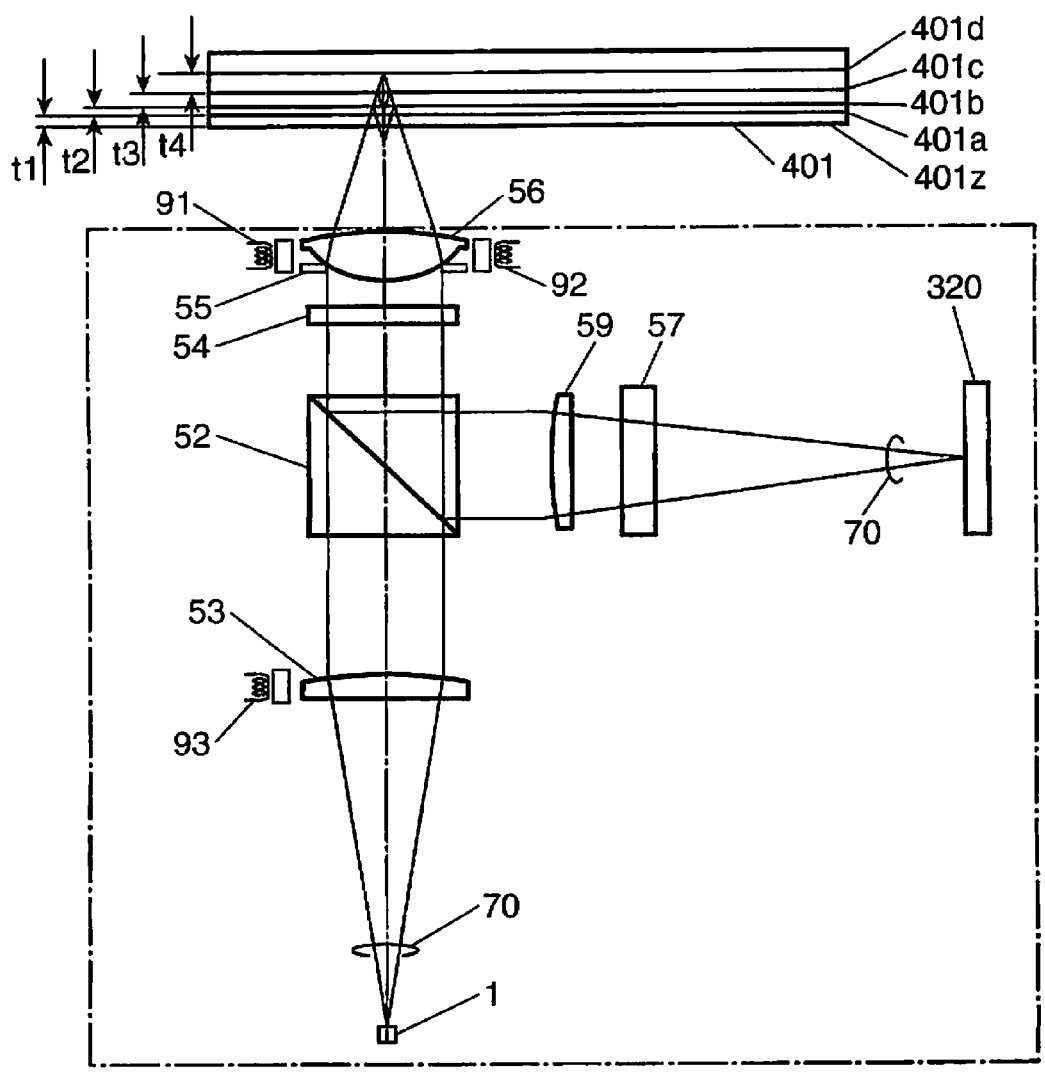
FIG. 14 is a diagram showing an arrangement of a conventional optical recording medium and optical head device.

FIG. 1 is a diagram showing a schematic arrangement of an optical recording medium embodying the invention, and an optical head device. FIG. 2 is a diagram showing a layer structure of the optical recording medium in the embodiment. An optical head device 201 irradiates blue laser light whose wavelength λ is 405 nm onto an optical recording medium 40 to reproduce a signal recorded in the optical recording medium 40. Since the arrangement and the operation of the optical head device 201 shown in FIG. 1 are substantially the same as the arrangement and the operation of the optical head device shown in FIG. 14, detailed description thereof is omitted herein.

The optical recording medium 40 as an example has four information recording surfaces. As shown in FIG. 2, the optical recording medium 40 has, in the order from a side closest to a surface 40z of the optical recording medium 40, a first information recording surface 40a, a second information recording surface 40b, a third information recording surface 40c, and a fourth information recording surface 40d.

The optical recording medium 40 is further provided with a cover layer 42, a first intermediate layer 43, a second intermediate layer 44, and a third intermediate layer 45. The thickness t1 of the cover layer 42 represents a thickness of a substrate from the surface 40z to the first information recording surface 40a, the thickness t2 of the first intermediate layer 43 represents a thickness of the substrate from the first information recording surface 40a to the second information recording surface 40b, the thickness t3 of the second intermediate layer 44 represents a thickness of the substrate from the second information recording surface 40b to the third information recording surface 40c, and the thickness t4 of the third intermediate layer 45 represents a thickness of the substrate from the third information recording surface 40c to the fourth information recording surface 40d.

The distance d1 (≈t1) represents a distance from the surface 40z to the first information recording surface 40a, the distance d2 (≈t1+t2) represents a distance from the surface 40z to the second information recording surface 40b, the distance d3 (≈t1+t2+t3) represents a distance from the surface 40z to the third information recording surface 40c, and the distance d4

(≈t1+t2+t3+t4) represents a distance from the surface 40z to the fourth information recording surface 40d.

Now, problems to be solved in the case where an optical recording medium has four information recording surfaces are described. Coherence between reflected light from multiple surfaces is described referring to FIGS. 3 through 7, as a first problem to be solved.

Figure 3:
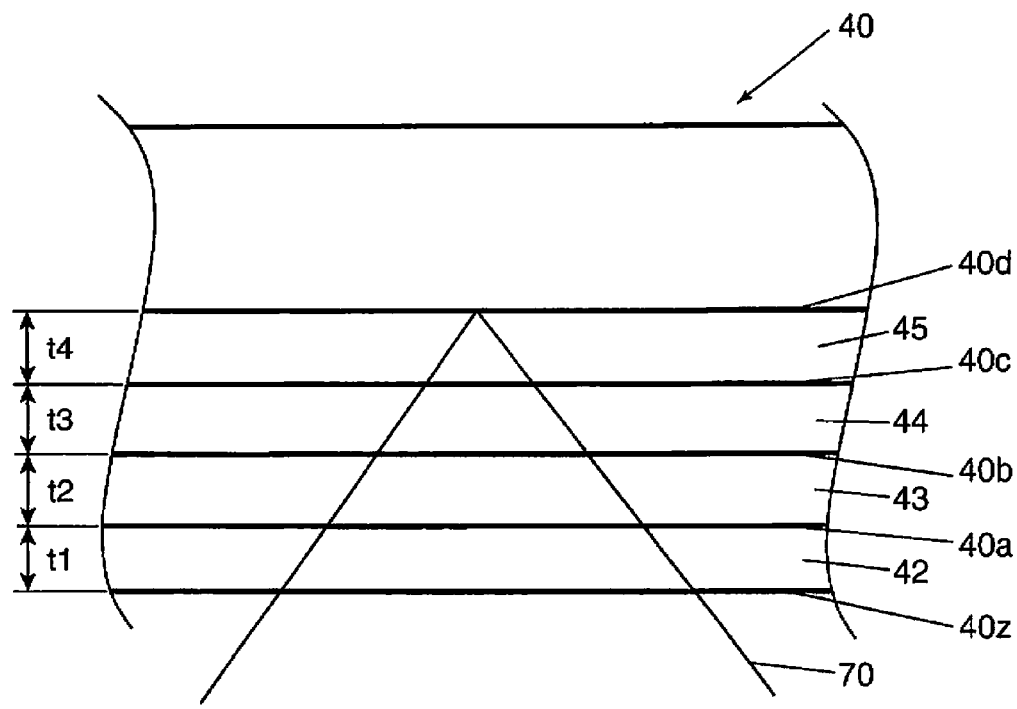
FIG. 3 is a diagram showing reflected light from a fourth information recording surface, in the case where a beam is collected on the fourth information recording surface.
Figure 4:
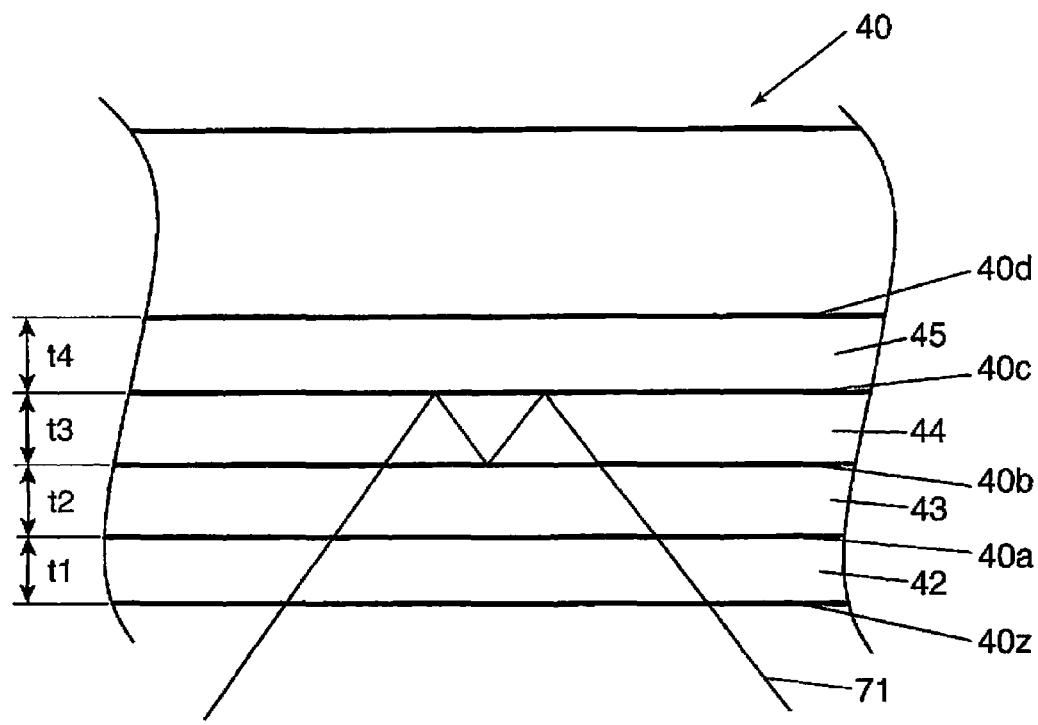
FIG. 4 is a diagram showing reflected light from a third information recording surface and a second information recording surface, in the case where a beam is collected on the fourth information recording surface.
Figure 5:
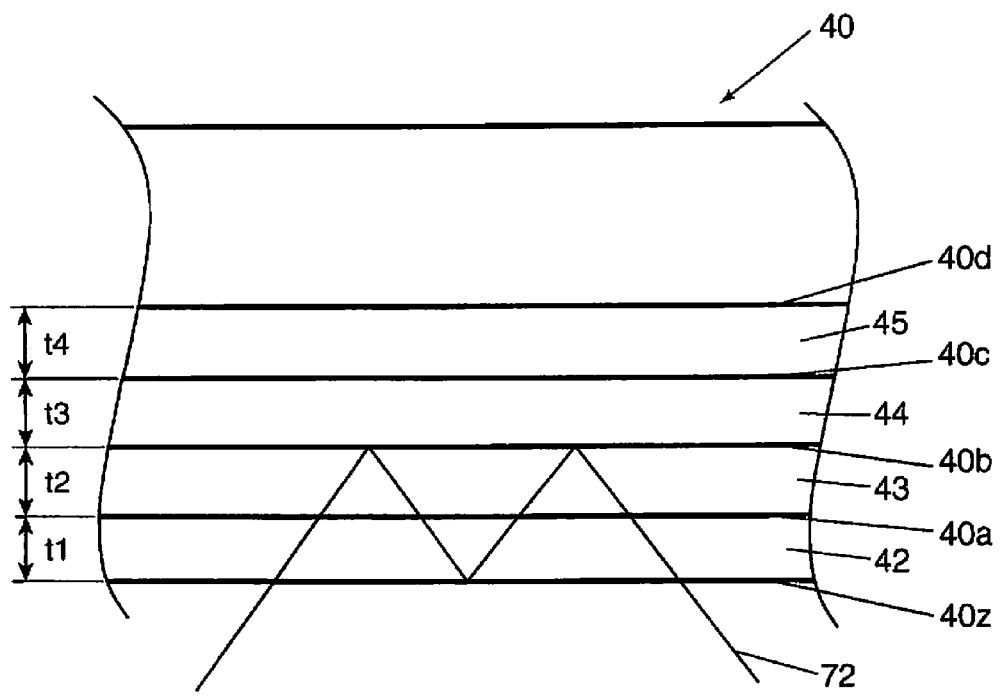
FIG. 5 is a diagram showing reflected light from the second information recording surface and a surface of the optical recording medium, in the case where a beam is collected on the fourth information recording surface.
Figure 6:
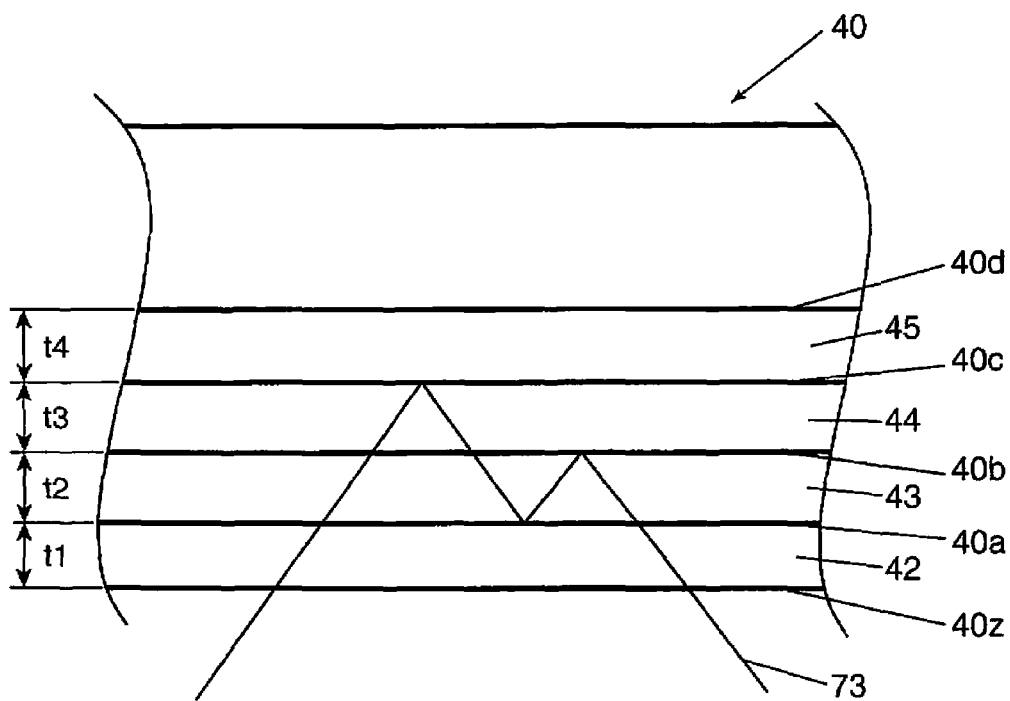
FIG. 6 is a diagram showing reflected light from the third information recording surface, a first information recording surface, and the second information recording surface, in the case where a beam is collected on the fourth information recording surface.

FIG. 3 is a diagram showing reflected light from the fourth information recording surface 40d, in the case where a beam is collected on the fourth information recording surface 40d. FIG. 4 is a diagram showing reflected light from the third information recording surface 40c and the second information recording surface 40b, in the case where a beam is collected on the fourth information recording surface 40d. FIG. 5 is a diagram showing reflected light from the second information recording surface 40b and the surface 40z, in the case where a beam is collected on the fourth information recording surface 40d. FIG. 6 is a diagram showing reflected light from the third information recording surface 40c, the first information recording surface 40a, and the second information recording surface 40b, in the case where a beam is collected on the fourth information recording surface 40d.

As shown in FIG. 3, a light flux collected on the fourth information recording surface 40d for information reproducing or recording is split into the following light beams by semi-translucency of an information recording layer (an information recording surface).

Specifically, a light flux collected on the fourth information recording surface 40d for information reproducing or recording is split into: a beam 70 shown in FIG. 3; a beam 71 (back focus light with respect to an information recording surface) shown in FIG. 4, a beam 72 (back focus light with respect to a medium surface) shown in FIG. 5, and a beam 73 shown in FIG. 6.

As shown in FIG. 3, the beam 70 is a beam reflected on the fourth information recording surface 40d and emitted from the surface 40z. As shown in FIG. 4, the beam 71 is a beam reflected on the third information recording surface 40c, focused and reflected on the backside of the second information recording surface 40b, reflected on the third information recording surface 40c, and emitted from the surface 40z. As shown in FIG. 5, the beam 72 is a beam reflected on the second information recording surface 40b, focused and reflected on the backside of the surface 40z, reflected on the second information recording surface 40b, and emitted from the surface 40z. As shown in FIG. 6, the beam 73 is a beam which is not focused on the surface 40z and the backsides of the information recording surfaces, but is reflected in the order of the third information recording surface 40c, the backside of the first information recording surface 40a, and the second information recording surface 40b, and emitted from the surface 40z.

First, let us consider a case that the refractive indexes of the cover layer 42, the first intermediate layer 43, the second intermediate layer 44, and the third intermediate layer 45 are equal to each other. In this case, the refractive indexes of the respective corresponding layers are set to "no".

For instance, in the case where the distance (thickness t4) between the fourth information recording surface 40d and the third information recording surface 40c, and the distance (thickness t3) between the third information recording surface 40c and the second information recording surface 40b are equal to each other, the beam 70 and the beam 71 pass a common optical path when exiting from the surface 40z. Accordingly, the beam 70 and the beam 71 are incident into a photodetector 320 with an identical light flux diameter. Similarly, in the case where the distance (thickness t4+thickness t3) between the fourth information recording surface 40d and the second information recording surface 40b, and the distance (thickness t2+thickness t1) between the second information recording surface 40b and the surface 40z are equal to each other, the beam 70 and the beam 72 pass a common optical path when exiting from the surface 40z. Accordingly, the beam 70 and the beam 72 are incident into the photodetector 320 with an identical light flux diameter. In the case where the distance (thickness t2) between the second information recording surface 40b and the first information recording surface 40a, and the distance (thickness t4) between the fourth information recording surface 40d and the third information recording surface 40c are equal to each other, the beam 70 and the beam 73 pass a common optical path when exiting from the surface 40z. Accordingly, the beam 70 and the beam 73 are incident into the photodetector 320 with an identical light flux diameter.

The light intensities of the beams 71 through 73 as reflected light from multiple surfaces are small, as compared with the light intensity of the beam 70. However, coherent contrast does not depend on a light intensity but depends on a light intensity ratio of light amplitude, and the light amplitude is a square root of the light intensity. Accordingly, even a small difference between light intensities results in a large coherent contrast. In the case where the beams 70 through 73 are incident into the photodetector 320 with an identical light flux diameter, an influence by coherence between the beams is large. Further, a light receiving amount by the photodetector 320 is greatly varied, resulting from a small change in thickness between the information recording surfaces, which makes it difficult to stably detect a signal.

Figure 7:
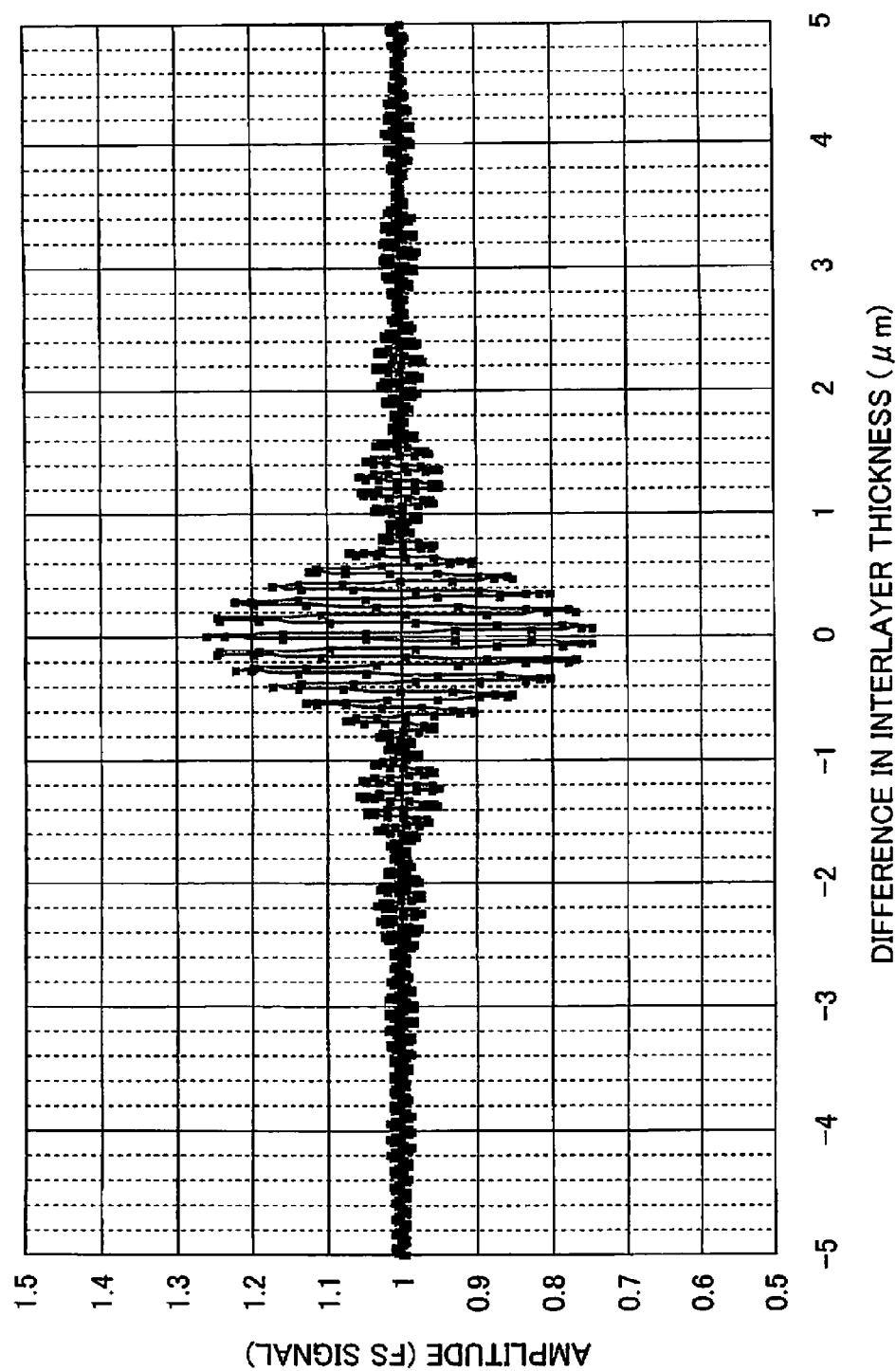
FIG. 7 is a diagram showing a relation between a difference in interlayer thickness, and an amplitude of an FS signal.

FIG. 7 is a diagram showing a relation between a difference in interlayer thickness, and an amplitude of an FS signal. FIG. 7 shows an amplitude of an FS signal (the sum of light intensities) with respect to a difference in interlayer thickness, in the case where the light intensity ratio between the beam 70; and the beam 71, or the beam 72, or the beam 73 is set to 100:1, and the refractive indexes of the cover layer 42 and the first intermediate layer 43 are each set to about 1.60 (1.57). Referring to FIG. 7, the axis of abscissas indicates a difference in interlayer thickness, and the axis of ordinate indicates an amplitude of an FS signal. The FS signal amplitude is a value obtained by normalizing light solely composed of the beam 70 to be detected by the photodetector 320 by a DC light amount, assuming that there is no reflection from the other information recording surfaces. In this embodiment, an interlayer means a layer between a surface of the optical recording medium and an information recording surface, and a layer between information recording surfaces adjacent to each other. As shown in FIG. 7, it is obvious that the FS signal is sharply changed when the difference in interlayer thickness becomes about 1 µm or less.

Similarly to the beam 72 shown in FIG. 5, in the case where the difference between the thickness t1 of the cover layer 42, and the sum (t2+t3+t4) of the thicknesses of the first through the third intermediate layers 43 through 45 is 1 µm or less, a problem such as variation of the FS signal also occurs.

As a second problem to be solved, an exceedingly small interlayer distance between adjacent information recording surfaces causes an influence of crosstalk from the adjacent information recording surface. In view of this, an interlayer distance of a predetermined value or more is necessary. Accordingly, various interlayer thicknesses are investigated, and an interlayer thickness which minimizes the influence is determined.

Figure 8:
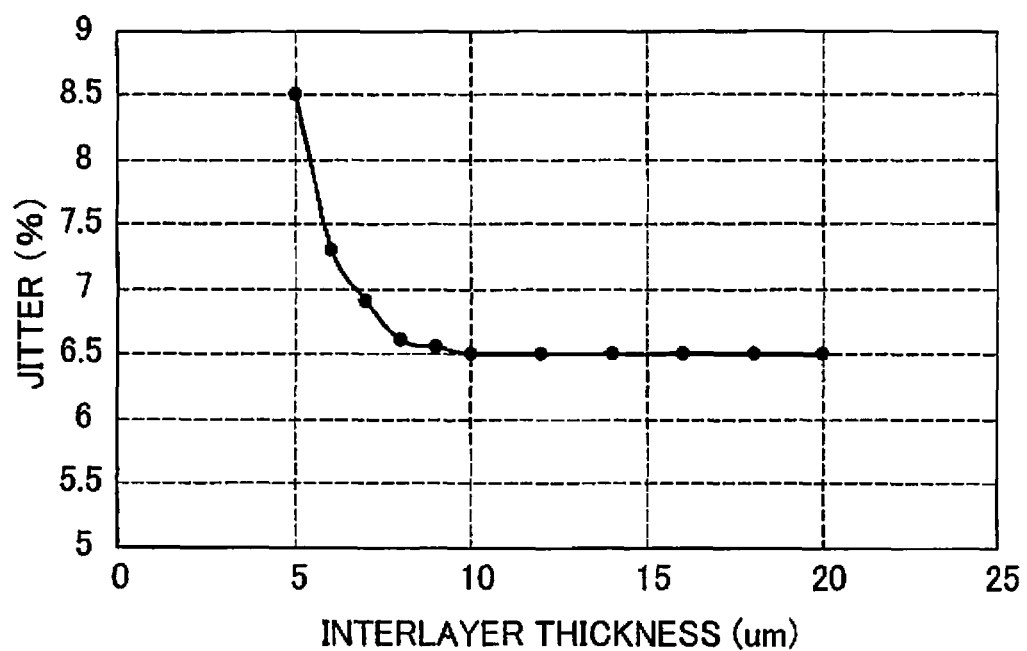
FIG. 8 is a diagram showing a relation between an interlayer thickness of an optical recording medium having information recording surfaces of reflectances substantially equal to each other, and a jitter.

FIG. 8 is a diagram showing a relation between an interlayer thickness of an optical recording medium having information recording surfaces having reflectances substantially equal to each other, and a jitter. The refractive index of the intermediate layer is set to about 1.60. Referring to FIG. 8, the axis of abscissas indicates an interlayer thickness, and the axis of ordinate indicates a jitter value. As the interlayer thickness is reduced, the jitter is deteriorated. The interlayer thickness where the jitter starts increasing is about 10 µm, and in the case where the interlayer thickness becomes 10 µm or less, the jitter is seriously deteriorated. Therefore, an optimum minimum value of the interlayer thickness is 10 µm.

Referring to FIG. 2, an arrangement of the optical recording medium 40 in the embodiment of the invention is described. In the embodiment, the structure of a four-layer disc (the optical recording medium 40) is defined in such a manner as to secure the following conditions (1) through (3) in order to eliminate an adverse effect of reflected light from the other information recording surfaces or a disc surface, considering a thickness variation among products.

Condition (1): The difference between the thickness t1 of the cover layer 42, and the sum (t2+t3+t4) of the thicknesses t2 through t4 of the first through the third intermediate layers 43 through 45 is set to 1 µm or more. In other words, the thicknesses t1, t2, t3, and t4 satisfy |t1−(t2+t3+t4)|≧1 µm.

Condition (2): The difference between any two values of the thicknesses t1, t2, t3, and t4 is set to 1 µm or more in any case.

Condition (3): The difference between the sum (t1+t2) of the thickness t1 of the cover layer 42 and the thickness t2 of the first intermediate layer 43, and the sum (t3+t4) of the thickness t3 of the second intermediate layer 44 and the thickness t4 of the third intermediate layer 45 is set to 1 µm or more. In other words, the thicknesses t1, t2, t3, and t4 satisfy |(t1+t2)−(t3+t4)|≧1 µm.

There are other combinations of interlayer thicknesses. However, in the case where the thickness t1 of the cover layer is set to a value approximate to the sum (t2+t3+t4) of the thicknesses t2 through t4 of the first through the third intermediate layers 43 through 45, there is no need of considering the other combinations. Therefore, description on the other combinations is omitted herein.

Figure 9:
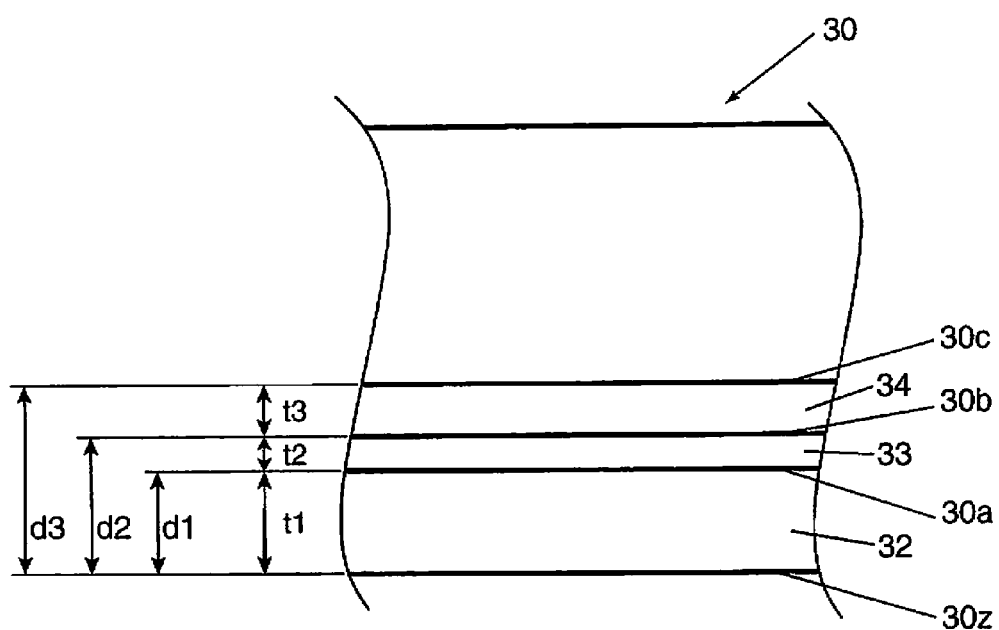
FIG. 9 is a diagram showing a layer structure of an optical recording medium as a modification of the embodiment of the invention.

FIG. 9 is a diagram showing a layer structure of an optical recording medium as a modification of the embodiment of the invention. An optical recording medium 30 shown in FIG. 9 has three information recording surfaces. As shown in FIG. 9, the optical recording medium 30 has, in the order from a side closest to a surface 30z of the optical recording medium 30, a first information recording surface 30a, a second information recording surface 30b, and a third information recording surface 30c. The optical recording medium 30 is further provided with a cover layer 32, a first intermediate layer 33, and a second intermediate layer 34.

The thickness t1 of the cover layer 32 represents a thickness of a substrate from the surface 30z to the first information recording surface 30a, the thickness t2 of the first intermediate layer 33 represents a thickness of the substrate from the first information recording surface 30a to the second information recording surface 30b, and the thickness t3 of the second intermediate layer 34 represents a thickness of the substrate from the second information recording surface 30b to the third information recording surface 30c.

The distance d1 (≈t1) represents a distance from the surface 30z to the first information recording surface 30a, the distance d2 (≈t1+t2) represents a distance from the surface 30z to the second information recording surface 30b, and the distance d3 (≈t1+t2+t3) represents a distance from the surface 30z to the third information recording surface 30c.

In the foregoing description, the structure of the four-layer disc is concretely described. In the case where a three-layer disc as shown in FIG. 9 is produced, the structure of the three-layer disc (the optical recording medium 30) is defined in such a manner as to secure the following conditions (1) and (2).

Condition (1): The difference between the thickness t1 of the cover layer 32, and the sum (t2+t3) of the thicknesses t2 and t3 of the first intermediate layer 33 and the second intermediate layer 34 is set to 1 µm or more. In other words, the optical recording medium 30 satisfies |t1−(t2+t3)|1 µm.

Condition (2): The difference between any two values of the thicknesses t1, t2, and t3 is set to 1 µm or more in any case.

Concerning a (N−1)-layer disc (where n is a positive integer equal to or more than 4), the above condition generally means that a difference between the sum of the thickness "ti" through the thickness "tj", and the sum of the thickness "tk" through the thickness "tm" is necessarily set to 1 µm or more, assuming that t1 is a thickness of the cover layer, and t2 through tN are thicknesses of the first through the N-th intermediate layers, where i, j, k, and m are each any positive integer satisfying i≦j<k≦m≦N. The cover layer thickness corresponds to a distance from the surface of the optical recording medium to the information recording surface closest to the medium surface. The above description is applied to the description that a distance from the surface of the optical recording medium to the information recording surface second closest to the medium surface is defined as d2, a distance from the surface of the optical recording medium to the information recording surface third closest to the medium surface is defined as d3, and a distance from the surface of the optical recording medium to the information recording surface fourth closest to the medium surface is defined as d4 in the same manner as described above.

Further, all the intermediate layer thicknesses are each set to 10 µm or more to solve the second problem.

The foregoing description has been made based on the premise that the refractive indexes of the cover layer and the intermediate layers are equal to the standard value, and all the refractive indexes of the cover layer and the intermediate layers are equal to each other. In the following, described is a case that the refractive indexes of the cover layer and the intermediate layers are different from the standard value, or the refractive indexes of the cover layer and the intermediate layers are different from each other among the layers.

The back focus problem as the first problem occurs because the size and the shape are similar to each other between signal light, and reflected light from the other information recording surface on the photodetector 320. In the case where the refractive index is set to about 1.60, it is possible to avoid the back focus problem, as far as a difference between the focus position of signal light, and the focus position of reflected light from the other information recording surface is smaller than 1 µm in the optical axis direction on the side of the optical recording medium. When the refractive index is set to about 1.60, crosstalk resulting from an adjacent information recording surface, as the second problem, occurs in the case where a defocus amount of signal light is smaller than 10 µm on an adjacent track.

In both of the cases, a defocus amount is an important factor to be considered. The defocus amount corresponds to the size of reflected light from the other information recording surface, or the size of a virtual image of reflected light from the other information recording surface at a position where signal light is focused. Let it be assumed that the radius of reflected light from the other information recording surface, or the radius of a virtual image of reflected light from the other information recording surface is RD. Since reflected light from the other information recording surface whose radius is RD is projected onto the photodetector 320, coherence and the magnitude of crosstalk depend on the size of the reflected light. The size of the reflected light may be defined as a divergent amount of light resulting from an interlayer thickness. The inventors found that in order to avoid the back focus problem and the crosstalk problem in the case where the refractive index is set to a value other than 1.60, it is necessary to define a condition that makes a defocus amount i.e. the size of reflected light from the other information recording surface or the size of a virtual image of reflected light from the other information recording surface substantially equal to each other. The above technique may be defined as a technique of converting an interlayer thickness, referring to a divergent amount of light resulting from an interlayer thickness.

Since the size of the photodetector is fixed, as the radius of a light beam is increased, the density of light to be incident into the photodetector is decreased. As the density of light is decreased, crosstalk is decreased. Thus, the magnitude of crosstalk depends on the size of reflected light.

A condition that makes a defocus (the size of reflected light from the other information recording surface, or the size of a virtual image of reflected light from the other information recording surface) with respect to a layer having a refractive index "nr" different from a standard refractive index "no" and a shape-wise thickness "tr" equal to a defocus with respect to a layer having the standard refractive index "no" and a shape-wise thickness "to" is expressed by the following formulas (2) and (3).

$$NA = nr \cdot \sin(\theta r) = no \cdot \sin(\theta o) \quad (2)$$

$$RD = tr \cdot \tan(\theta r) = to \cdot \tan(\theta o) \quad (3)$$

In the formulas, NA represents a numerical aperture of an objective lens 56 for converging light onto an optical recording medium. For instance, NA=0.85. The symbols θr and θo respectively represent convergence angles of light in materials having the refractive index "nr" and the refractive index "no". The symbol RD represents a radius of reflected light from the other information recording surface, or a radius of a virtual image of reflected light from the other information recording surface. The symbols "sin" and "tan" respectively represent a sine function and a tangent function. The standard refractive index "no" is set to e.g. 1.60, and more preferably set to 1.57.

The convergence angle θr is expressed by the following formula (4), and the convergence angle θo is expressed by the following formula (5), based on the formula (2).

$$\theta r = \arcsin(NA/nr) \quad (4)$$

$$\theta o = \arcsin(NA/no) \quad (5)$$

In the formulas, arcsin represents an inverse sine function.

The thickness "to" is expressed by the following formula (6), and the thickness "tr" is expressed by the following formula (7), based on the formula (3).

$$to = tr \cdot \tan(\theta r)/\tan(\theta o) \quad (6)$$

$$tr = to \cdot \tan(\theta o)/\tan(\theta r) \quad (7)$$

The thickness "to" is calculated using the formula (6) to derive the thickness of a layer having the refractive index "no" with respect to the shape-wise thickness "tr" of a layer having the refractive index "nr".

Conversely, the thickness "tr" is calculated using the formula (7) to derive the shape-wise thickness "tr" of a layer having the refractive index "nr" with respect to the thickness "to" of a layer having the refractive index "no".

Figure 10:
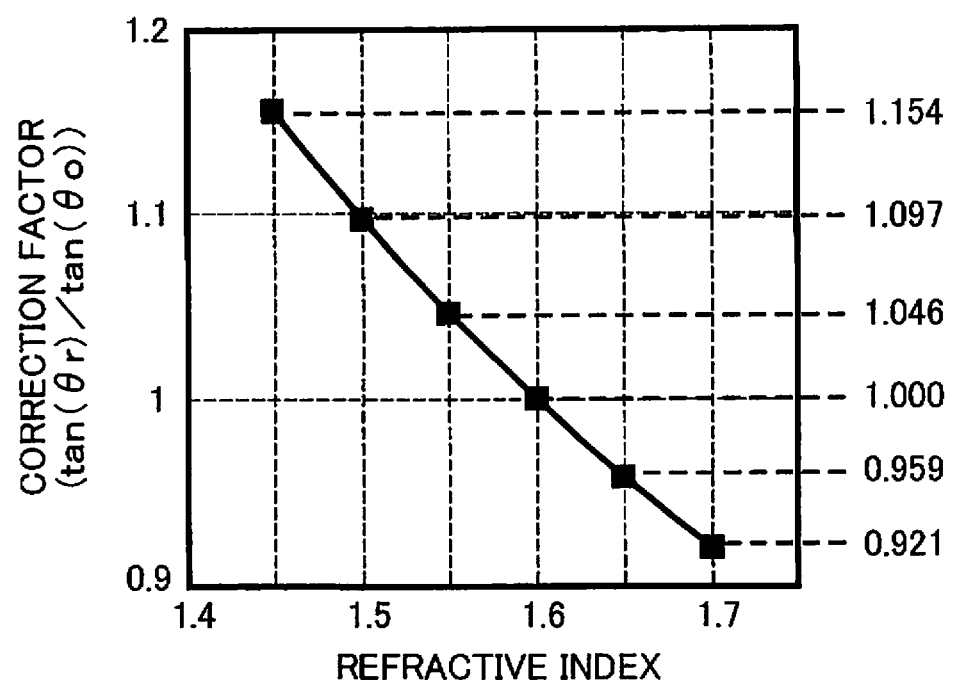
FIG. 10 is an explanatory diagram showing a refractive index dependence of a factor for converting a shape-wise thickness in terms of an actual refractive index into a thickness in terms of a standard refractive index.

The factor portion in the formula (6) i.e. tan (θr)/tan(θo) is expressed as a function f(nr) of the refractive index "nr" in FIG. 10. The factor portion in the formula (7) i.e. tan (θo)/tan (θr) is an inverse number 1/f(nr) of the function f(nr). The factor portion tan (θo)/tan (θr) is expressed as the inverse number 1/f(nr) of the function f(nr) of the refractive index "nr" in FIG. 11.

Figure 11:
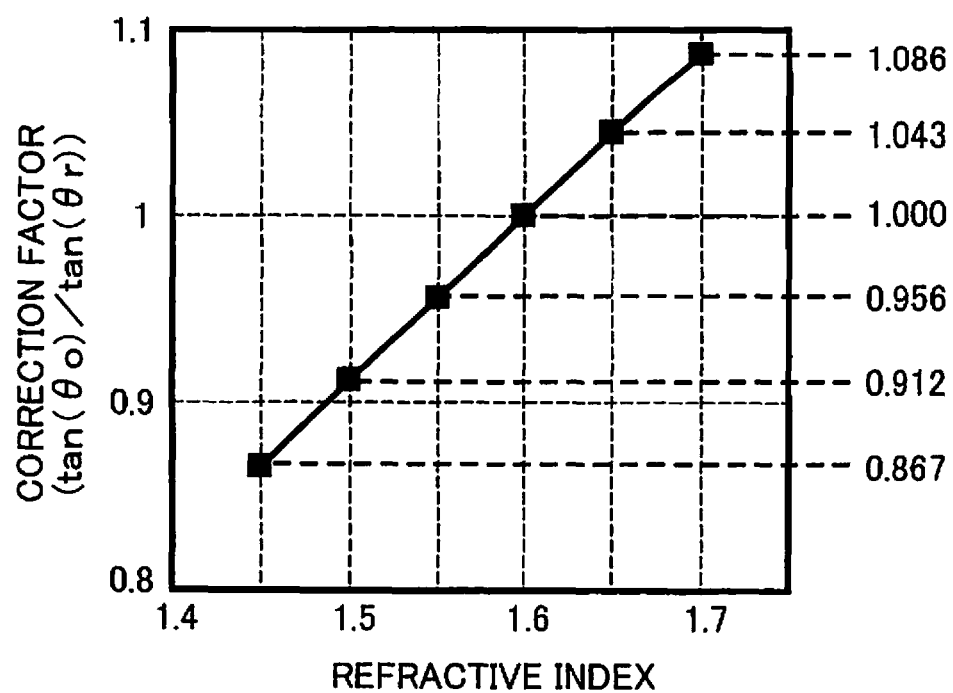
FIG. 11 is an explanatory diagram showing a refractive index dependence of a factor for converting a thickness in terms of a standard refractive index into a shape-wise thickness in terms of an actual refractive index.

FIG. 10 is an explanatory diagram showing a refractive index dependence of a factor for converting a shape-wise thickness in terms of an actual refractive index into a thickness in terms of a standard refractive index. FIG. 11 is an explanatory diagram showing a refractive index dependence of a factor for converting a thickness in terms of a standard refractive index into a shape-wise thickness in terms of an actual refractive index.

Since both of the function f(nr) and the inverse number 1/f(nr) of the function f(nr) have a smooth curve, the function f(nr) and the inverse number 1/f(nr) of the function f(nr) can be expressed by polynomial expressions. The inventors found that it is possible to obtain an approximate polynomial expression with precision of about 0.1% by using a third expression. Specifically, the function f(nr) is expressed by a third expression as represented by the following formula (8), and the inverse number 1/f(nr) of the function f(nr) is expressed by a third expression as represented by the following formula (9).

$$f(n) = -1.088n^3 + 6.1027n^2 - 12.042n + 9.1007 \quad (8)$$

$$1/f(n) = 0.1045n^3 - 0.6096n^2 + 2.0192n - 1.0979 \quad (9)$$

To simplify the expressions, in the formula (8) and the formula (9), the refractive index "nr" is abbreviated as "n".

As shown in FIG. 10, approximation of the function f(nr) expressed by six points normally corresponds to approximation of a fifth expression. However, as the order is increased, the function f(nr) may fluctuate or the calculation thereof may become complex. On the other hand, as the order is reduced, precision of the function f(nr) may be lowered.

The invention has been made based on a necessary and sufficient condition that thickness precision of a disc is about 0.1 μm. Accordingly, securing precision higher than the required value is meaningless. In view of this, the inventors derived the aforementioned formulas (8) and (9), based on a new finding that establishing a third expression is a necessary and sufficient condition to satisfy thickness precision of about 0.1 μm.

Specifically, assuming that shape-wise thicknesses of a cover layer and first through (N−1)-th intermediate layers of an optical recording medium having refractive indexes nr1, nr2, . . . , and nrN are respectively tr1, tr2, . . . , and trN in the order from the surface of the optical recording medium where light is incident, the thicknesses tr1, tr2, . . . , and trN are converted into thicknesses t1, t2, . . . , and tN of layers having a predetermined refractive index "no" which makes a divergent amount equal to a divergent amount of a light beam resulting from the thicknesses tr1, tr2, . . . , and trN. Further, a difference DFF between the sum of a thickness "ti" through a thickness "tj", and the sum of a thickness "tk" through a thickness "tm" is set to 1 μm or more (where i, j, k, and m are each any positive integer satisfying i≦j<k≦m≦N). Furthermore, the thicknesses t1, t2, . . . , and tN are calculated by products of the function f(n) expressed by the above-described formula (8), and the thicknesses tr1, tr2, . . . , and trN. In the formula (8), n=nr1, nr2, . . . , and nrN.

Further, assuming that shape-wise thicknesses of a cover layer and first through (N−1)-th intermediate layers of an optical recording medium having refractive indexes nr1, nr2, . . . , and nrN are respectively tr1, tr2, . . . , and trN in the order from the surface of the optical recording medium where light is incident, targeted values of the thicknesses tr1, tr2, . . . , and trN are calculated by converting thicknesses t1, t2, . . . , and tN of layers having a predetermined refractive index "no" into the thicknesses tr1, tr2, . . . , and trN which makes a divergent amount equal to a divergent amount of a light beam resulting from the thicknesses t1, t2, . . . , and tN. Further, a difference DFF between the sum of a thickness "ti" through a thickness "tj", and the sum of a thickness "tk" through a thickness "tm" is set to 1 μm or more (where i, j, k, and m are each any integer satisfying i≦j<k≦m≦N). Furthermore, the thicknesses t1, t2, . . . , and tN are calculated by products of the inverse number of the function f(n) expressed by the formula (9), and the thicknesses t1, t2, . . . , and tN. In the formula (9), n=nr1, nr2, . . . , and nrN.

As an example, there is described a relation between the thickness t1 of the cover layer, and the sum of the thicknesses t2 through t4 of the first through the third intermediate layers of the four-layer disc (the optical recording medium 40). Let us consider a case that all the refractive indexes of the layers are set to a standard refractive index "no" i.e. set to 1.60, the thickness t1 of the cover layer is set to 54 μm, the thickness t2 of the first intermediate layer is set to 10 μm, the thickness t3 of the second intermediate layer is set to 21 μm, and the thickness t4 of the third intermediate layer is set to 19 μm. The sum of the thickness t2 of the first intermediate layer through the thickness t4 of the third intermediate layer becomes 50 μm. In this case, the difference between the thickness t1 of the cover layer, and the sum of the thicknesses t2 through t4 of the first through the third intermediate layers is 4 μm, which is significantly larger than 1 μm.

If, however, the refractive index "nr" of the cover layer is set to 1.70, a different result is obtained, even if the shape-wise thickness tr1 of the cover layer remains the same i.e. set to 54 μm. It is obvious, from the formulas (4) and (6) or from FIG. 10, that the thickness tr1 of a layer having the refractive index "nr" is converted into the thickness t1 of a layer having the standard refractive index "no" by multiplying the thickness tr1 by 0.921. As a result, the thickness t1 of the layer having the refractive index "no" is set to: t1=0.921×tr1=49.7 μm, which is smaller than 50 μm i.e. the sum of the thicknesses t2 through t4 of the first through the third intermediate layers.

Conversely, it is obvious from the formulas (5) and (7) or from FIG. 11 that a difference between the thickness tr1 of the cover layer, and the sum of the thicknesses t2 through t4 of the first through the third intermediate layers is set to 1 μm or more, and the thickness tr1 of the cover layer is set to 51 μm or more by multiplying the thickness t1 of a layer having the refractive index "no" by 1.086. In other words, the thickness tr1 of the layer having the refractive index "nr" is set to: tr1=51×1.086≈55.4 μm. Accordingly, it is necessary to set the shape-wise thickness tr1 of the cover layer to 55.4 μm or more, in the case where the refractive index "nr" is set to 1.70. The above example is merely an example, and the invention may embrace a value parameter other than the above. Further, in the case where the refractive index is a numerical value other than the ones shown in FIG. 10 or FIG. 11, a factor may be calculated by substituting the refractive index in the formula (8) or the formula (9).

It is also necessary to satisfy a specific condition about the thickness of the cover layer and the thicknesses of the intermediate layers from another aspect. It is desirable to set the cover layer thickness and the intermediate layer thicknesses in a predetermined range including a standard value to perform a stable focus jumping operation. A focus jumping operation is an operation of changing a focus position from a certain information recording surface to another information recording surface. In performing a focus jumping operation, it is desirable to secure a focus error signal of good quality with respect to a targeted information recording surface by e.g. moving a collimator lens 53 prior to a focus jumping operation to stably obtain a focus error signal with respect to the targeted information recording surface. In view of this, it is desirable to set a difference in spherical aberration between information recording surfaces in a predetermined range.

If the refractive index is changed, the spherical aberration amount is changed, even if the thickness is unchanged. Accordingly, it is desirable to set a targeted value or an allowable range of an intermediate layer thickness in such a manner that the spherical aberration amount lies in a predetermined range.

Referring back to the description on the back focus problem, in the case where the refractive index of a predetermined layer (the cover layer or the intermediate layer) is nr(min) ≦nr≦nr(max), the thickness "tr" of the layer having the refractive index "nr" can be obtained by implementing the formulas: θr(min)=arcsin(NA/nr(min)) and θr(max)=arcsin(NA/nr(max)), and using the formula: to=tr·tan(θr)/tan(θo) in the similar manner as described above. Thus, the thickness range of the intermediate layers may be determined.

The optical recording medium in the embodiment is not limited to one of a rewritable disc, a recordable disc, and a read only disc, but may be any of these discs.

As described above, signal fluctuation and signal quality deterioration resulting from the back focus problem occur, in the case where the sizes or the shapes are the same with each other between signal light, and reflected light from the other information recording surface on the photodetector. A state that the sizes or the shapes are the same with each other between signal light, and reflected light from the other information recording surface on the photodetector means a state that focus positions appear to be the same with each other between signal light, and reflected light from the other information recording surface, including a virtual image of reflected light from the other information recording surface. Optical paths of signal light and reflected light from the other information recording surface are partly different from each other in a transparent substrate of an optical disc. In the case where defocus amounts resulting from a difference in optical path are equal to each other, the focus position of signal light, and the focus position of reflected light from the other information recording surface appear to be the same with each other. In the case where divergences of convergent light i.e. the radii of convergent light are the same with each other between signal light, and reflected light from the other information recording surface, it is determined that defocus amounts resulting from a substrate thickness are equal to each other.

In view of the above, calculation based on the divergent radius R of a light spot resulting from a substrate thickness is made in order to determine whether the back focus problem can be avoided by setting the shape-wise thickness "tr" in terms of the refractive index "nr". In this example, the shape-wise thickness indicates a material thickness, and may also be called as a physical thickness.

An interlayer coherence resulting from a reduced intermediate layer thickness can be avoided, if the spot configuration (the radius R) on an adjacent layer is sufficiently large. In view of this, calculation based on the divergent radius R of a light spot resulting from a substrate thickness is made in order to determine whether the interlayer coherence can be avoided by setting the shape-wise thickness "tr" in terms of the refractive index "nr".

Assuming that the thickness of a cover layer or an intermediate layer is "t", the numerical aperture of a light spot is NA (NA=0.85), and the convergence angle of light in a substrate is θ, since NA=n·sin(θ), θ=arcsin(NA/n). In this formula, "arcsin" represents an inverse sine function. The divergent radius R of a light spot can be calculated by R=t·tan(θ).

The standard refractive index is defined as "no", the thickness of a layer having the standard refractive index "no" is defined as "to", and the convergence angle of light in a substrate of the layer is defined as "θo". The standard refractive index "no" is set to e.g. 1.60. The layer (targeted layer) constituting a thickness portion of a transparent substrate of an actual optical disc is indicated with the suffix "r", the refractive index of the targeted layer is defined as "nr", the shape-wise thickness of the targeted layer is defined as "tr", and the convergence angle of light in a substrate is defined as "θr". In this case, the convergence angles θo and θr are respectively expressed by: θo=arcsin(NA/no) and θr=arcsin(NA/nr).

The divergent radius R of a light spot is expressed by: R=tr·tan (θr)=to·tan(θo). Accordingly, the thickness "to" of a layer having the standard refractive index "no" is expressed by: to=tr·tan(θr)/tan(θo))=tr·f(nr).

The function f(nr) is a factor for deriving the thickness "to" of a layer having the standard refractive index "no" with respect to the shape-wise thickness "tr", and is the function shown in the graph of FIG. 10.

For instance, let us consider a four-layer disc having four layers of information recording surfaces. The four-layer disc (the optical recording medium 40) has, in the order from the surface (a light incident surface) 40z of the disc, the first information recording surface 40a, the second information recording surface 40b, the third information recording surface 40c, and the fourth information recording surface 40d. The four-layer disc is further provided with the cover layer 42 between the light incident surface 40z and the first information recording surface 40a, the first intermediate layer 43 between the first information recording surface 40a and the second information recording surface 40b, the second intermediate layer 44 between the second information recording surface 40b and the third information recording surface 40c, and the third intermediate layer 45 between the third information recording surface 40c and the fourth information recording surface 40d.

Let it be assumed that the shape-wise thickness of the cover layer 42 is tr1, and the actual refractive index of the cover layer 42 is nr1; the shape-wise thickness of the first intermediate layer 43 is tr2, and the actual refractive index of the first intermediate layer 43 is nr2; the shape-wise thickness of the second intermediate layer 44 is tr3, and the actual refractive index of the second intermediate layer 44 is nr3; and the shape-wise thickness of the third intermediate layer 45 is tr4, and the actual refractive index of the third intermediate layer 45 is nr4.

Converting the thicknesses tr1, tr2, tr3, and tr4 of the cover layer 42 and the first through the third intermediate layers 43 through 45 respectively into the thicknesses t1, t2, t3, and t4 of the cover layer 42 and the first through the third intermediate layers 43 through 45 each having the standard refractive index "no", based on a defocus amount, yields a result: t1=tr1×f(nr1), t2=tr2×f(nr2), t3=tr3×f(nr3), and t4=tr4×f(nr4).

Normally, the thickness of the cover layer is larger than the thickness of the intermediate layer. In view of this, the four-layer disc should satisfy all the conditions: |t1−(t2+t3+t4)|≧1 μm, |t2−t3|≧1 μm, |t3−t4)|≧1 μm, and |t2−t4|≧1 μm to avoid the back focus problem.

Further, the four-layer disc should satisfy all the conditions: t2≧10 μm, t3≧10 μm, and t4≧10 μm to avoid the interlayer coherence. In other words, the thicknesses t1, t2, t3, and t4 of the cover layer 42, the first intermediate layer 43, the second intermediate layer 44, and the third intermediate layer 45 are each set to 10 μm or more.

As described above, the optical recording medium 40 includes the first information recording surface 40a closest to the light incident surface 40z of the optical recording medium 40, the second information recording surface 40b second closest to the surface 40z, the third information recording surface 40c third closest to the surface 40z, the fourth information recording surface 40d fourth closest to the surface 40z, the cover layer 42 having a refractive index nr1 different from the predetermined refractive index "no" and formed between the surface 40z and the first information recording surface 40a, the first intermediate layer 43 having a refractive index nr2 different from the refractive index "no" and formed between the first information recording surface 40a and the second information recording surface 40b, the second intermediate layer 44 having a refractive index nr3 different from the refractive index "no" and formed between the second information recording surface 40b and the third information recording surface 40c, and the third intermediate layer 45 having a refractive index nr4 different from the refractive index "no" and formed between the third information recording surface 40c and the fourth information recording surface 40d.

Further, the shape-wise thicknesses tr1, tr2, tr3, and tr4 of the cover layer 42, the first intermediate layer 43, the second intermediate layer 44, and the third intermediate layer 45 are respectively converted into the thicknesses t1, t2, t3, and t4 of the respective layers having the predetermined refractive index "no".

Furthermore, a defocus amount generated in a layer having a refractive index nrα and a thickness trα (satisfying: $1 \leq \alpha \leq 4$ (where α is a positive integer)) is equal to a defocus amount generated in a layer having the refractive index "no" and a thickness tα (satisfying: $1 \leq \alpha \leq 4$ (where α is a positive integer)).

Furthermore, the thicknesses t1, t2, t3, and t4 satisfy |t1−(t2+t3+t4)|≧1 μm, a difference between any two values of the thicknesses t1, t2, t3, and t4 is set to 1 μm or more in any case, and |(t1+t2)−(t3+t4)|≧1 μm.

Thus, the thicknesses t1, t2, t3, and t4 obtained by converting the shape-wise thickness tr1, tr2, tr3, and tr4 of the cover layer 42, the first intermediate layer 43, the second intermediate layer 44, and the third intermediate layer 45 satisfy |t1−(t2+t3+t4)|≧1 μm, a difference between any two values of the thicknesses t1, t2, t3, and t4 is set to 1 μm or more in any case, and |(t1+t2)−(t3+t4)|≧1 μm. This enables to prevent light from forming an image on the backside of the surface of the optical recording medium, and suppress coherence between reflected light from the information recording surfaces to thereby improve the quality of a servo signal and a reproduction signal.

Further, since the distance between the surface of the optical recording medium, and the information recording surface closest to the surface of the optical recording medium can be set to a large value, deterioration of a reproduction signal in the case where there is a damage or a smear on the surface of the optical recording medium can be suppressed.

Further, in the case where the thickness of a layer having the refractive index nrα is set to trα (satisfying: $1 \leq \alpha \leq 4$ (where α is a positive integer)), the convergence angle of light in the layer having the refractive index nrα is set to θrα (satisfying: $1 \leq \alpha \leq 4$ (where α is a positive integer)), the thickness of a layer having the refractive index "no" is set to tα (satisfying: $1 \leq \alpha \leq 4$ (where α is a positive integer)), and the convergence angle of light in the layer having the refractive index "no" is set to θo, the thickness trα is converted into the thickness tα based on the following formula (10).

$$t\alpha = tr\alpha \cdot (\tan(\theta r\alpha)/\tan(\theta o)) \quad (10)$$

Preferably, the range of the thickness tα of a layer having the refractive index "no" and whose spherical aberration amount lies in a predetermined allowable range may be converted into a range of the thickness trα of a layer having the refractive index nrα, and the thickness trα may be included in the range of the thickness trα after conversion.

Generally, it is necessary to set the performance of a light spot in the range of the Marechal Criteria. If the performance of a light spot exceeds the range of the Marechal Criteria, a signal may be extremely deteriorated. In view of this, the ranges of the respective conditions are defined in such a manner that a spherical aberration amount generated in a layer having the refractive index "no" lies in a range of 70 mλ or less, which is the range of the Marechal Criteria.

In this embodiment, the refractive indexes nr1, nr2, nr3, and nr4 are each different from the refractive index "no". The invention is not specifically limited to the above. Alternatively, the refractive indexes nr1, nr2, nr3, and nr4 may each be equal to the refractive index "no". The modification is advantageous in that the manufacturing method for the optical recording medium can be standardized without depending on the value of the refractive index.

As another example, let us consider a case that a three-layer disc having three recording layers is produced. A three-layer disc (the optical recording medium 30) has, in the order from the surface (a light incident surface) 30z of the disc, the first information recording surface 30a, the second information recording surface 30b, and the third information recording surface 30c. The three-layer disc is further provided with the cover layer 32 between the light incident surface 30z and the first information recording surface 30a, the first intermediate layer 33 between the first information recording surface 30a and the second information recording surface 30b, and the second intermediate layer 34 between the second information recording surface 30b and the third information recording surface 30c.

Let it be assumed that the shape-wise thickness of the cover layer 32 is tr1, and the actual refractive index of the cover layer 32 is nr1; the shape-wise thickness of the first intermediate layer 33 is tr2, and the actual refractive index of the first intermediate layer 33 is nr2; and the shape-wise thickness of the second intermediate layer 34 is tr3, and the actual refractive index of the second intermediate layer 34 is nr3.

Converting the thicknesses tr1, tr2, and tr3 of the cover layer 32, the first intermediate layer 33, and the second intermediate layer 34 respectively into the thicknesses t1, t2, and t3 of the cover layer 32, the first intermediate layer 33, and the second intermediate layer 34 each having the standard refractive index "no", based on a defocus amount, yields a result: t1=tr1×f(nr1), t2=tr2×f(nr2), and t3=tr3×f(nr3).

Normally, the thickness of the cover layer is larger than the thickness of the intermediate layer. In view of this, the three-layer disc should satisfy all the conditions: $|t1-(t2+t3)| \geq 1$ μm, and $|t2-t3| \geq 1$ μm to avoid the back focus problem.

Further, the three-layer disc should satisfy all the conditions: $t2 \geq 10$ μm, and $t3 \geq 10$ μm to avoid the interlayer coherence. In other words, the thicknesses t1, t2, and t3 of the cover layer 32, the first intermediate layer 33, and the second intermediate layer 34 are each set to 10 μm or more.

As described above, the optical recording medium 30 includes the first information recording surface 30a closest to the light incident surface 30z of the optical recording medium 30, the second information recording surface 30b second closest to the surface 30z, the third information recording surface 30c third closest to the surface 30z, the cover layer 32 having a refractive index nr1 different from the predetermined refractive index "no" and formed between the surface 30z and the first information recording surface 30a, the first intermediate layer 33 having a refractive index nr2 different from the refractive index "no" and formed between the first information recording surface 30a and the second information recording surface 30b, and the second intermediate layer 34 having a refractive index nr3 different from the refractive index "no" and formed between the second information recording surface 30b and the third information recording surface 30c.

Further, the shape-wise thicknesses tr1, tr2, and tr3 of the cover layer 32, the first intermediate layer 33, and the second intermediate layer 34 are respectively converted into the thicknesses t1, t2, and t3 of the respective layers having the predetermined refractive index "no".

Furthermore, a defocus amount generated in a layer having the refractive index nrα and the thickness trα (satisfying: $1 \leq \alpha \leq 3$ (where α is a positive integer)) is equal to a defocus amount generated in a layer having the refractive index "no" and the thickness to (satisfying: $1 \leq \alpha \leq 3$ (where α is a positive integer)).

Furthermore, the thicknesses t1, t2, and t3 satisfy $|t1-(t2+t3)| \geq 1$ μm, and a difference between any two values of the thicknesses t1, t2, and t3 is set to 1 μm or more in any case.

Thus, the thicknesses t1, t2, and t3 obtained by converting the shape-wise thickness tr1, tr2, and tr3 of the cover layer 32, the first intermediate layer 33, and the second intermediate layer 34 satisfy $|t1-(t2+t3)| \geq 1$ μm, and a difference between any two values of the thicknesses t1, t2, and t3 is set to 1 μm or more in any case. This enables to prevent light from forming an image on the backside of the surface of the optical recording medium, and suppress coherence between reflected light from the information recording surfaces to thereby improve the quality of a servo signal and a reproduction signal.

Further, since the distance between the surface of the optical recording medium and the information recording surface closest to the surface of the optical recording medium can be set to a large value, deterioration of a reproduction signal in the case where there is a damage or a smear on the surface of the optical recording medium can be suppressed.

Further, in the case where the thickness of a layer having the refractive index nrα is set to trα (satisfying: $1 \leq \alpha \leq 3$ (where α is a positive integer)), the convergence angle of light in the layer having the refractive index nrα is set to θrα (satisfying: $1 \leq \alpha \leq 3$ (where α is a positive integer)); the thickness of a layer having the refractive index "no" is set to tα (satisfying: $1 \leq \alpha \leq 3$ (where α is a positive integer)), and the convergence angle of light in the layer having the refractive index "no" is set to θo, the thickness trα is converted into the thickness tα based on the following formula (11).

$$t\alpha = tr\alpha \cdot (\tan(\theta r\alpha)/\tan(\theta o)) \quad (11)$$

In the three-layer disc as well as the four-layer disc, preferably, the range of the thickness tα of a layer having the refractive index "no" and whose spherical aberration amount lies in a predetermined allowable range may be converted into a range of the thickness trα of a layer having the refractive index nrα, and the thickness trα may be included in the range of the thickness trα after conversion.

In the case where the layer between the medium surface and the information recording surface or each layer between the information recording surfaces is constituted of plural material layers having refractive indexes different from each other, at first, the thicknesses of the material layers are calculated in terms of the standard refractive index. Specifically, the actual thickness of each material layer having the refractive index "nr" is converted into the thickness of each material layer having the standard refractive index "no", based on a defocus amount, by multiplying the shape-wise thickness by the function value "f". Then, the thicknesses of the material layers after conversion are integrated.

For instance, in the case where a cover layer having the shape-wise thickness tr1 is constituted of a first cover layer having the thickness tr11 and the refractive index nr11, a second cover layer having the thickness tr12 and the refractive index nr12 . . . , and the N-th cover layer having the thickness tr1N and the refractive index nr1N, converting the shape-wise thickness of the cover layer into the thickness t1 of the cover layer having the standard refractive index "no", based on a defocus amount, yields a result: t1=Σtr1k×f(nrk). In this formula, Σ represents an integration from 1 through N with respect to "k".

In the case where an objective lens having a large numerical aperture (NA) is used, spherical aberration sharply changes depending on the thickness of a transparent substrate through which light is transmitted. If the spherical aberration is large, the sensitivity of a focus error signal, serving as an index to be used in focus control, may be different from the design sensitivity, or focus error signal deterioration such as a decrease in signal amplitude may occur.

Accordingly, in the case where focus control is started from a state that focus control is not performed, or stability in focus jumping is obtained, it is desirable to correct spherical aberration with respect to a targeted layer for focus control in advance. In view of this, it is desirable to set the thickness from the medium surface to an information recording layer, and the thickness of an intermediate layer in a predetermined range including a standard value.

The focus jumping operation is an operation of changing a focus position from a certain information recording surface to another information recording surface. The standard value or a predetermined range for a focus jumping operation should be defined, referring to the spherical aberration for the above reason. Accordingly, in the case where the refractive index is set to a value other than the standard value, the shape-wise thickness is changed depending on the refractive index.

In view of the above, for instance, the layer thickness of a multilayer optical disc is designed as follows. First, the refractive index of a material constituting a transparent substrate is defined. Next, the shape-wise thickness from the medium surface to an information recording surface, and the shape-wise thicknesses of intermediate layers are determined in accordance with the obtained refractive index, referring to the spherical aberration. Since it is impossible to set a production error to zero, the shape-wise thickness is determined including an error range. The shape-wise thickness from the medium surface to an information recording surface, and the shape-wise thicknesses of intermediate layers may be determined, using a numerical value table or a chart. The spherical aberration is proportional to the layer thickness. Accordingly, the shape-wise thickness from the medium surface to an information recording surface, and the shape-wise thicknesses of intermediate layers may be determined by calculating a conversion factor g(nr) depending on a refractive index in accordance with a wavelength or a numerical aperture, and using the calculated conversion factor g(nr).

For instance, blue light of a wavelength 405 nm is converged on an information recording surface through a substrate having a refractive index of 1.60 and a thickness of 0.1 mm. An objective lens having a numerical aperture of 0.85 converges blue light of a wavelength 405 nm without aberration. The thickness ts(nr) (unit: mm) of a substrate which minimizes the aberration when the refractive index of the substrate is changed is calculated. As a result of the calculation, the conversion factor g(nr) is set to: g(nr)=ts(nr)/0.1.

Figure 12:
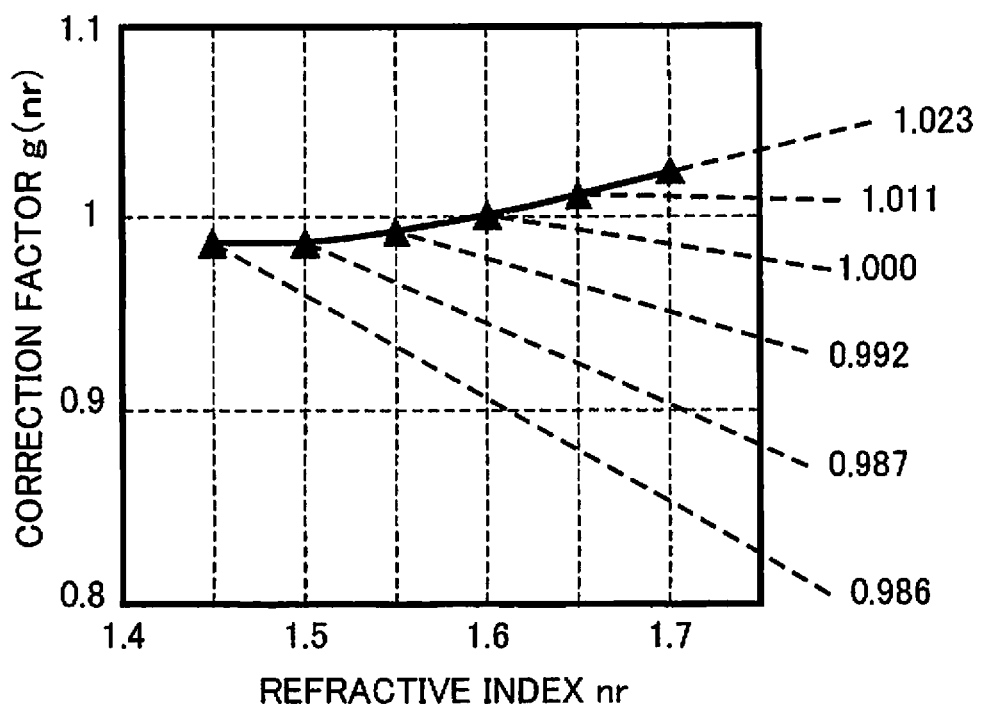
FIG. 12 is an explanatory diagram showing a refractive index dependence of a factor for converting a shape-wise thickness in terms of an actual refractive index into a thickness in terms of a standard refractive index, based on a spherical aberration.

FIG. 12 is an explanatory diagram showing a refractive index dependence of a factor for converting a shape-wise thickness in terms of an actual refractive index into a thickness in terms of a standard refractive index, based on a spherical aberration. FIG. 12 shows a conversion factor g(nr) derived by the inventors. Since both of the conversion factor g(nr) and the inverse number (1/g(nr)) of the conversion factor g(nr) have a smooth curve, the conversion factor g(nr) and the inverse number (1/g(nr)) of the conversion factor g(nr) can be expressed by polynomial expressions. The inventors found that it is possible to obtain an approximate polynomial expression with precision of about 0.1% by using a third expression. Specifically, the function g(nr) is expressed by a third expression as represented by the following formula (12).

$$g(n) = -1.1111n^3 + 5.8143n^2 - 9.8808n + 6.476 \quad (12)$$

To simplify the expressions, in the formula (12), the refractive index "nr" is abbreviated as "n".

A proper relation between a substrate thickness and a refractive index is also disclosed in JP 2004-288371A and JP 2004-259439A. However, the relation between a substrate thickness and a refractive index disclosed in JP 2004-288371A and JP 2004-259439A is different from the formula (12). Accordingly, the relation between a substrate thickness and a refractive index disclosed in JP 2004-288371A and JP 2004-259439A does not accurately express the relation between a substrate thickness and a refractive index, which makes a spherical aberration constant, as shown in FIG. 12. In this embodiment, a substrate thickness which makes a third-order spherical aberration constant is obtained depending on a refractive index by actually tracing a light ray, without performing an approximation. Thus, in this embodiment, the accurate relation between a substrate thickness and a refractive index is successfully defined.

The thicknesses of the cover layer and the first through the (N−1)-th intermediate layers are set in such a range that spherical aberration lies in a predetermined range. Targeted values of the thicknesses tr1, tr2, . . . , and trN are calculated by products of the thicknesses t1, t2, . . . , and tN, and the function g(n) expressed by the above-described formula (12) to set the thicknesses of the cover layer and the first through the (N−1)-th intermediate layers in such a range that spherical aberration lies in a predetermined range. In the formula (12), n=nr1, nr2, . . . , and nrN.

The shape-wise thickness of a cover layer can be obtained, based on the shape-wise thickness from the medium surface to an information recording surface, and the shape-wise thicknesses of intermediate layers, which have been calculated in the above-described manner. Then, these thicknesses are converted into thicknesses of the respective corresponding layers each having the standard refractive index "no", referring to a defocus amount in the above-described manner. Alternatively, the shape-wise thicknesses of the cover layer and the intermediate layers of an actually fabricated optical disc may be obtained. Then, determination is made as to whether the back focus problem and the interlayer coherence as described above can be avoided, whether the design range is proper, and whether the quality of the fabricated optical disc has passed, using the thicknesses of the respective corresponding layers after conversion.

The thickness from the medium surface to an information recording surface can be calculated based on the sum of the cover layer thickness and the intermediate layer thicknesses. In the case of a three-layer disc, the shape-wise thickness from the medium surface to the first information recording surface is set to tr1, the shape-wise thickness from the medium surface to the second information recording surface is set to (tr1+tr2), and the shape-wise thickness from the medium surface to the third information recording surface is set to (tr1+tr2+tr3).

In the case of a four-layer disc, the shape-wise thickness from the medium surface to the first information recording surface is set to tr1, the shape-wise thickness from the medium surface to the second information recording surface is set to (tr1+tr2), the shape-wise thickness from the medium surface to the third information recording surface is set to (tr1+tr2+tr3), and the shape-wise thickness from the medium surface to the fourth information recording surface is set to (tr1+tr2+tr3+tr4).

The optical recording medium in the embodiment enables to prevent light from forming an image on the backside of the surface of the optical recording medium, and suppress coherence between reflected light from the information recording surfaces to thereby improve the quality of a servo signal and a reproduction signal. Further, in the above arrangement, a guideline for producing the products can be clearly set by setting the guideline for designing the thickness of the optical recording medium depending on the refractive index in the above-described manner.

As described above, the shape-wise thicknesses tr1, tr2, tr3, and tr4 of the cover layer 42, the first intermediate layer 43, the second intermediate layer 44, and the third intermediate layer 45 of the optical recording medium 40 having four information recording surfaces are determined depending on the refractive indexes nr1, nr2, nr3, and nr4, referring to a spherical aberration. Then, the thicknesses tr1, tr2, tr3, and tr4 are respectively converted into the thicknesses t1, t2, t3, and t4 of the respective layers having the predetermined refractive index "no", referring to a defocus amount. Then, the thicknesses tr1, tr2, tr3, and tr4 are calculated by products of the thicknesses t1, t2, t3, and t4, and the function g(n) expressed by the above-described formula (12) to set the thicknesses t1, t2, t3, and t4 in such a range that the spherical aberration lies in a predetermined range. Thereafter, the thicknesses t1, t2, t3, and t4 are calculated by products of the function f(n) expressed by the above-described formula (8), and the calculated thicknesses tr1, tr2, tr3, and tr4. Further, the re-calculated thicknesses t1, t2, t3, and t4 satisfy the following formula (13).

$$|(t1+t2)-(t3+t4)| \geq 1 \,\mu m \tag{13}$$

Further, the shape-wise thicknesses tr1, tr2, and tr3 of the cover layer 32, the first intermediate layer 33, and the second intermediate layer 34 of the optical recording medium 30 having three information recording surfaces are determined depending on the refractive indexes nr1, nr2, and nr3, referring to a spherical aberration. Then, the thicknesses tr1, tr2, and tr3 are respectively converted into the thicknesses t1, t2, and t3 of the respective layers having the predetermined refractive index "no", referring to a defocus amount. Then, the thicknesses tr1, tr2, and tr3 are calculated by products of the thicknesses t1, t2, and t3, and the function g(n) expressed by the above-described formula (12) to set the thicknesses t1, t2, and t3 in such a range that the spherical aberration lies in a predetermined range. Thereafter, the thicknesses t1, t2, and t3 are calculated by products of the function f(n) expressed by the above-described formula (8), and the calculated thicknesses tr1, tr2, and tr3. Further, the re-calculated thicknesses t1, t2, and t3 satisfy the following formula (14).

$$|t1-(t2+t3)| \geq 1 \,\mu m \tag{14}$$

Next, an example of an optical information device which performs a focus jumping operation is described.

Figure 13:
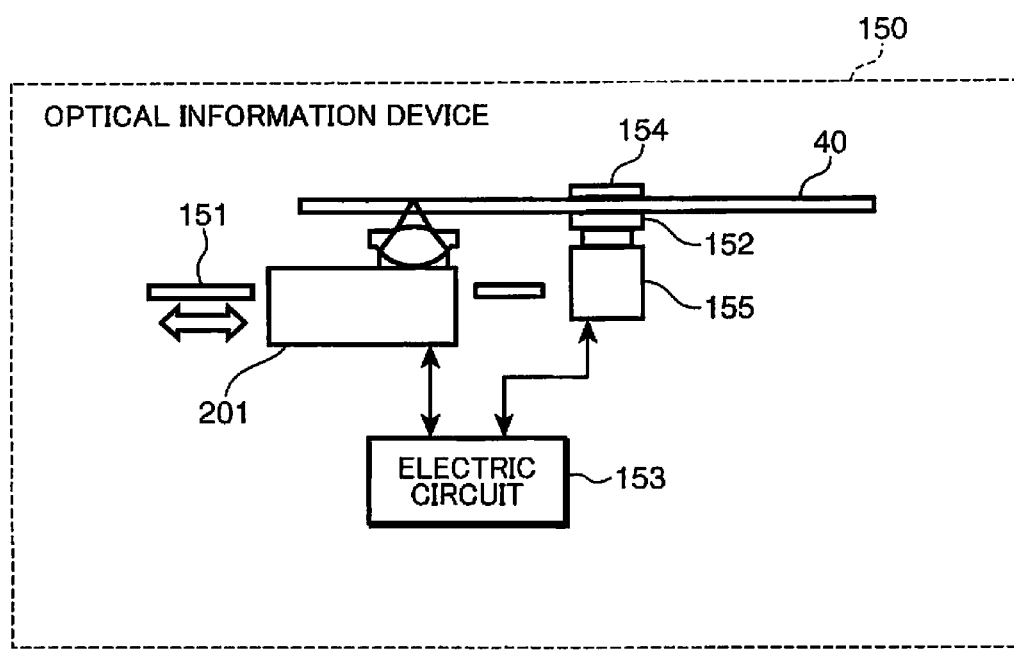
FIG. 13 is a diagram showing a schematic arrangement of an optical information device embodying the invention.

FIG. 13 is a diagram showing a schematic arrangement of an optical information device embodying the invention. The optical information device 150 reproduces or records information with respect to plural information recording surfaces by moving a light spot of laser light to be irradiated onto the optical recording medium 40 from a predetermined information recording surface to another information recording surface of the optical recording medium 40.

The optical information device 150 converges a light spot of laser light onto a predetermined information recording surface of the plural information recording surfaces to reproduce information from the predetermined information recording surface. In the case where information is reproduced from another information recording surface of the plural information recording surfaces different from the predetermined information recording surface, the optical information device 150 shifts the light spot of laser light from the predetermined information recording surface to the another information recording surface to reproduce the information from the another information recording surface.

The optical information device 150 includes a driving device 151, a turntable 152, an electric circuit 153, a clamper 154, a motor 155, and an optical head device 201. The optical head device 201 in FIG. 13 has the same arrangement as the arrangement of the optical head device 201 shown in FIG. 1, and an optical recording medium 40 in FIG. 13 has the same arrangement as the arrangement of the optical recording medium 40 shown in FIG. 2.

The optical recording medium 40 is placed on the turntable 152, and is fixedly supported by the clamper 154. The motor 155 rotates the turntable 152 to thereby rotate the optical recording medium 40. The driving device 151 coarsely drives the optical head device 201 to a track on the optical recording medium 40 where intended information is recorded.

The optical head device 201 shifts the focus position of laser light to be irradiated onto the optical recording medium from a certain information recording surface to another information recording surface to reproduce or record information with respect to the plural information recording surfaces.

The optical head device 201 transmits a focus error signal and a tracking error signal to the electric circuit 153 in correspondence to a positional relation with respect to the optical recording medium 40. The electric circuit 153 transmits a signal for finely moving the objective lens 56 to the optical head device 201 in accordance with the focus error signal and the tracking error signal. The optical head device 201 performs focus control and tracking control with respect to the optical recording medium 40, based on a signal from the electric circuit 153. The optical head device 201 reads out information from the optical recording medium 40, writes (records) information into the optical recording medium 40, or erases information from the optical recording medium 40.

The electric circuit 153 controls and drives the motor 155 and the optical head device 201, based on a signal to be obtained from the optical head device 201. The electric circuit 153 mainly controls the focus jumping sequence. Specifically, the electric circuit 153 controls the optical head device 201 in such a manner as to correct spherical aberration generated in an information recording surface as a focus jumping destination, before shifting the focus position. A concrete spherical aberration correction method for the optical head device 201 has been described in the foregoing description.

The optical information device 150 in the embodiment is operable to correct spherical aberration generated in an information recording surface as a focus jumping destination by shifting the collimator lens 53 with respect to the optical recording medium 40 before a focus jumping operation is performed, and thereafter shift the focus position. This enables to improve the quality of a focus error signal with respect to a targeted information recording surface to thereby stably perform a focus jumping operation.

The aforementioned embodiment mainly includes the features having the following arrangements.

A manufacturing method for an optical recording medium according to an aspect of the invention is a manufacturing method for an optical recording medium having (N−1) (where N is a positive integer of 4 or more) information recording surfaces, wherein, assuming that shape-wise thicknesses of a cover layer and first through (N−1)-th intermediate layers of the optical recording medium having refractive indexes nr1, nr2, ..., and nrN are respectively tr1, tr2, ..., and trN in the order from a surface of the optical recording medium where light is incident, the thicknesses tr1, tr2, ..., and trN are converted into thicknesses t1, t2, ..., and tN of layers having a predetermined refractive index "no" which makes a divergent amount equal to a divergent amount of a light beam resulting from the thicknesses tr1, tr2, ..., and trN; a difference DFF between the sum of thicknesses ti through tj, and the sum of thicknesses tk through tm is 1 µm or more (where i, j, k, and m are each any positive integer satisfying $i \leq j < k \leq m \leq N$); and the thicknesses t1, t2, ..., and tN are calculated by products of a function f(n) expressed by the following formula (15), and the thicknesses tr1, tr2, ..., and trN:

$$f(n) = -1.088n^3 + 6.1027n^2 - 12.042n + 9.1007 \qquad (15)$$

in the formula (15), n=nr1, nr2, ..., and nrN.

In the above arrangement, assuming that shape-wise thicknesses of a cover layer and first through (N−1)-th intermediate layers of the optical recording medium having refractive indexes nr1, nr2, ..., and nrN are respectively tr1, tr2, ..., and trN in the order from a surface of the optical recording medium where light is incident, the thicknesses tr1, tr2, ..., and trN are converted into thicknesses t1, t2, ..., and tN of layers having a predetermined refractive index "no" which makes a divergent amount equal to a divergent amount of a light beam resulting from the thicknesses tr1, tr2, ..., and trN. Further, a difference DFF between the sum of a thickness "ti" through a thickness "tj", and the sum of a thickness "tk" through a thickness "tm" is set to 1 µm or more (where i, j, k, and m are each any positive integer satisfying $i \leq j < k \leq m \leq N$). Furthermore, the thicknesses t1, t2, ..., and tN are calculated by products of the function f(n) expressed by the above-described formula (15), and the thicknesses tr1, tr2, ..., and trN.

As described above, since the difference DFF between the sum of the thickness "ti" through the thickness "tj", and the sum of the thickness "tk" through the thickness "tm" is set to 1 µm or more, it is possible to prevent light from forming an image on the backside of the surface of the optical recording medium, and suppress coherence between reflected light from the information recording surfaces to thereby improve the quality of a servo signal and a reproduction signal. Further, since the distance between the surface of the optical recording medium and the information recording surface closest to the surface of the optical recording medium can be set to a large value, deterioration of a reproduction signal in the case where there is a damage or a smear on the surface of the optical recording medium can be suppressed.

A manufacturing method for an optical recording medium according to another aspect of the invention is a manufacturing method for an optical recording medium having (N−1) (where N is a positive integer of 4 or more) information recording surfaces, wherein, assuming that shape-wise thicknesses of a cover layer and first through (N−1)-th intermediate layers of the optical recording medium having refractive indexes nr1, nr2, ..., and nrN are respectively tr1, tr2, ..., and trN in the order from a surface of the optical recording medium where light is incident, targeted values of the thicknesses tr1, tr2, ..., and trN are calculated by converting thicknesses t1, t2, ..., and tN of layers having a predetermined refractive index "no" into the thicknesses tr1, tr2, ..., and trN which makes a divergent amount equal to a divergent amount of a light beam resulting from the thicknesses t1, t2, ..., and tN; a difference DFF between the sum of a thickness "ti" through a thickness "tj", and the sum of a thickness "tk" through a thickness "tm" is set to 1 µm or more (where i, j, k, and m are each any positive integer satisfying $i \leq j < k \leq m \leq N$); and the thicknesses t1, t2, ..., and tN are calculated by products of an inverse number 1/f(n) of a function f(n) expressed by the following formula (16), and the thicknesses t1, t2, ..., and tN:

$$1/f(n) = 0.1045n^3 - 0.6096n^2 + 2.0192n - 1.0979 \qquad (16)$$

in the formula (16), n=nr1, nr2, ..., and nrN.

In the above arrangement, assuming that shape-wise thicknesses of a cover layer and first through (N−1)-th intermediate layers of the optical recording medium having refractive indexes nr1, nr2, ..., and nrN are respectively tr1, tr2, ..., and trN in the order from a surface of the optical recording medium where light is incident, targeted values of the thicknesses tr1, tr2, ..., and trN are calculated by converting thicknesses t1, t2, ..., and tN of layers having a predetermined refractive index "no" into the thicknesses tr1, tr2, ..., and trN which makes a divergent amount equal to a divergent amount of a light beam resulting from the thicknesses t1, t2, ..., and tN. Further, a difference DFF between the sum of a thickness "ti" through a thickness "tj", and the sum of a thickness "tk" through a thickness "tm" is set to 1 µm or more (where i, j, k, and m are each any positive integer satisfying $i \leq j < k \leq m \leq N$). Furthermore, the thicknesses t1, t2, ..., and tN are calculated by products of an inverse number 1/f(n) of the function f(n) expressed by the above-described formula (16), and the thicknesses t1, t2, ..., and tN.

As described above, since the difference DFF between the sum of the thickness "ti" through the thickness "tj", and the sum of the thickness "tk" through the thickness "tm" is set to 1 µm or more, it is possible to prevent light from forming an image on the backside of the surface of the optical recording medium, and suppress coherence between reflected light from the information recording surfaces to thereby improve the quality of a servo signal and a reproduction signal. Further, since the distance between the surface of the optical recording medium and the information recording surface closest to the surface of the optical recording medium can be set to a large value, deterioration of a reproduction signal in the case where there is a damage or a smear on the surface of the optical recording medium can be suppressed.

In the manufacturing method for an optical recording medium, preferably, thicknesses of the cover layer and the first through the (N−1)-th intermediate layers may be set in such a range that a spherical aberration lies in a predetermined range.

In the above arrangement, since the thicknesses of the cover layer and the first through the (N−1)-th intermediate layers are set in such a range that a spherical aberration lies in a predetermined range, it is possible to suppress the spherical aberration in the cover layer and the first through the (N−1)-th intermediate layers having the thicknesses tr1, tr2, . . . , and trN.

In the manufacturing method for an optical recording medium, preferably, targeted values of the thicknesses tr1, tr2, . . . , and trN may be calculated by products of the thicknesses t1, t2, . . . , and tN, and a function g(n) expressed by the following formula (17) to set thicknesses of the cover layer and the first through the (N−1)-th intermediate layers in such a range that a spherical aberration lies in a predetermined range:

$$g(n)=-1.1111n^3+5.8143n^2-9.8808n+6.476 \quad (17)$$

in the formula (17), n=nr1, nr2, . . . , and nrN.

In the above arrangement, targeted values of the thicknesses tr1, tr2, . . . , and trN are calculated by products of the thicknesses t1, t2, . . . , and tN, and the function g(n) expressed by the above-described formula (17) to set thicknesses of the cover layer and the first through the (N−1)-th intermediate layers in such a range that a spherical aberration lies in a predetermined range.

The above arrangement enables to easily calculate the targeted values of the thicknesses tr1, tr2, . . . , and trN capable of suppressing the spherical aberration.

In the manufacturing method for an optical recording medium, preferably, the refractive index "no" may be set to 1.60.

In the above arrangement, it is possible to convert the shape-wise thicknesses of the cover layer and the first through the (N−1)-th intermediate layers into the thicknesses t1, t2, . . . , and tN of the respective layers having a refractive index of 1.60.

In the manufacturing method for an optical recording medium, preferably, the thicknesses t1, t2, . . . , and tN may each be set to 10 μm or more.

In the above arrangement, it is possible to reduce an influence of crosstalk from an information recording surface adjacent to the targeted information recording surface by setting each of the thicknesses t1, t2, . . . , and tN to 10 μm or more to thereby reduce coherence between reflected light from the information recording surfaces.

An optical recording medium according to another aspect of the invention is an optical recording medium having (N−1) (where N is a positive integer of 4 or more) information recording surfaces. The optical recording medium includes: a cover layer formed between a surface of the optical recording medium where light is incident, and the first information recording surface closest to the medium surface; and first through (N−1)-th intermediate layers formed between the respective first through N-th information recording surfaces, wherein, assuming that shape-wise thicknesses of the cover layer and the first through the (N−1)-th intermediate layers of the optical recording medium having refractive indexes nr1, nr2, . . . , and nrN are respectively tr1, tr2, . . . , and trN in the order from the surface of the optical recording medium where light is incident, the thicknesses tr1, tr2, . . . , and trN are converted into thicknesses t1, t2, . . . , and tN of layers having a predetermined refractive index "no" which makes a divergent amount equal to a divergent amount of a light beam resulting from the thicknesses tr1, tr2, . . . , and trN; a difference DFF between the sum of a thickness "ti" through a thickness "tj", and the sum of a thickness "tk" through a thickness "tm" is set to 1 μm or more (where i, j, k, and m are each any positive integer satisfying i≦j<k≦m≦N); and the thicknesses t1, t2, . . . , and tN are calculated by products of a function f(n) expressed by the following formula (18), and the thicknesses tr1, tr2, . . . , and trN:

$$f(n)=-1.088n^3+6.1027n^2-12.042n+9.1007 \quad (18)$$

in the formula (18), n=nr1, nr2, . . . , and nrN.

According to the above arrangement, the optical recording medium includes a cover layer formed between a surface of the optical recording medium where light is incident, and the first information recording surface closest to the medium surface; and first through (N−1)-th intermediate layers formed between the respective first through N-th information recording surfaces. Assuming that shape-wise thicknesses of the cover layer and the first through the (N−1)-th intermediate layers of the optical recording medium having refractive indexes nr1, nr2, . . . , and nrN are respectively tr1, tr2, . . . , and trN in the order from the surface of the optical recording medium where light is incident, the thicknesses tr1, tr2, . . . , and trN are converted into thicknesses t1, t2, . . . , and tN of layers having a predetermined refractive index "no" which makes a divergent amount equal to a divergent amount of a light beam resulting from the thicknesses tr1, tr2, . . . , and trN. Further, a difference DFF between the sum of a thickness "ti" through a thickness "tj", and the sum of a thickness "tk" through a thickness "tm" is set to 1 μm or more (where i, j, k, and m are each any positive integer satisfying i≦j<k≦m≦N). Furthermore, the thicknesses t1, t2, . . . , and tN are calculated by products of the function f(n) expressed by the above-described formula (18), and the thicknesses tr1, tr2, . . . , and trN.

As described above, since the difference DFF between the sum of the thickness "ti" through the thickness "tj", and the sum of the thickness "tk" through the thickness "tm" is set to 1 μm or more, it is possible to prevent light from forming an image on the backside of the surface of the optical recording medium, and suppress coherence between reflected light from the information recording surfaces to thereby improve the quality of a servo signal and a reproduction signal. Further, since the distance between the surface of the optical recording medium and the information recording surface closest to the surface of the optical recording medium can be set to a large value, deterioration of a reproduction signal in the case where there is a damage or a smear on the surface of the optical recording medium can be suppressed.

An optical recording medium according to another aspect of the invention is an optical recording medium having a plurality of information recording surfaces. The optical recording medium includes a cover layer having a refractive index nr1, and formed between a surface of the optical recording medium where light is incident and the first information recording surface closest to the medium surface; a first intermediate layer having a refractive index nr2, and formed between the first information recording surface and the second information recording surface second closest to the medium surface; a second intermediate layer having a refractive index nr3, and formed between the second information recording surface and the third information recording surface third closest to the medium surface; and a third intermediate layer having a refractive index nr4, and formed between the third information recording surface and the fourth information recording surface fourth closest to the medium surface, wherein shape-wise thicknesses tr1, tr2, tr3, and tr4 of the cover layer, the first intermediate layer, the second intermediate layer, and the third intermediate layer are respectively determined depending on the refractive indexes nr1, nr2, nr3, and nr4, referring to a spherical aberration, the thicknesses tr1, tr2, tr3, and tr4 are respectively converted into thicknesses t1, t2, t3, and t4 of the respective layers having a predetermined refractive index "no", referring to a defocus amount, the thicknesses tr1, tr2, tr3, and tr4 are calculated by products of the thicknesses t1, t2, t3, and t4, and a function g(n) expressed by the following formula (19) to set the thicknesses t1, t2, t3, and t4 in such a range that the spherical aberration lies in a predetermined range, the thicknesses t1, t2, t3, and t4 are calculated by products of a function f(n) expressed by the following formula (20), and the calculated thicknesses tr1, tr2, tr3, and tr4, and the re-calculated thicknesses t1, t2, t3, and t4 satisfy the following formula (21):

$$g(n)=-1.1111nr^3+5.8143nr^2-9.8808nr+6.476 \quad (19)$$

$$f(n)=-1.088nr^3+6.1027nr^2-12.042nr+9.1007 \quad (20)$$

$$|(t1+t2)-(t3+t4)| \geq 1 \text{ μm} \quad (21)$$

in the formulas (19) and (20), n=nr1, nr2, nr3, and nr4.

In the above arrangement, the optical recording medium includes a cover layer having a refractive index nr1, and formed between a surface of the optical recording medium where light is incident and the first information recording surface closest to the medium surface; a first intermediate layer having a refractive index nr2, and formed between the first information recording surface and the second information recording surface second closest to the medium surface; a second intermediate layer having a refractive index nr3, and formed between the second information recording surface and the third information recording surface third closest to the medium surface; and a third intermediate layer having a refractive index nr4, and formed between the third information recording surface and the fourth information recording surface fourth closest to the medium surface. Shape-wise thicknesses tr1, tr2, tr3, and tr4 of the cover layer, the first intermediate layer, the second intermediate layer, and the third intermediate layer are respectively determined depending on the refractive indexes nr1, nr2, nr3, and nr4, referring to a spherical aberration. Further, the thicknesses tr1, tr2, tr3, and tr4 are respectively converted into thicknesses t1, t2, t3, and t4 of the respective layers having a predetermined refractive index "no", referring to a defocus amount. Furthermore, the thicknesses tr1, tr2, tr3, and tr4 are calculated by products of the thicknesses t1, t2, t3, and t4, and the function g(n) expressed by the above-described formula (19) to set the thicknesses t1, t2, t3, and t4 in such a range that the spherical aberration lies in a predetermined range. Thereafter, the thicknesses t1, t2, t3, and t4 are calculated by products of the function f(n) expressed by the above-described formula (20), and the calculated thicknesses tr1, tr2, tr3, and tr4, and the re-calculated thicknesses t1, t2, t3, and t4 satisfy the above-described formula (21).

As described above, since the thicknesses t1, t2, t3, and t4 obtained by conversion from the shape-wise thicknesses tr1, tr2, tr3, and tr4 of the cover layer, the first intermediate layer, the second intermediate layer, and the third intermediate layer satisfy the relation: $|(t1+t2)-(t3+t4)| \geq 1$ μm, it is possible to prevent light from forming an image on the backside of the surface of the optical recording medium, and suppress coherence between reflected light from the information recording surfaces to thereby improve the quality of a servo signal and a reproduction signal. Further, since the distance between the surface of the optical recording medium, and the information recording surface closest to the surface of the optical recording medium can be set to a large value, deterioration of a reproduction signal in the case where there is a damage or a smear on the surface of the optical recording medium can be suppressed.

An optical recording medium according to another aspect of the invention is an optical recording medium having a plurality of information recording surfaces. The optical recording medium includes a cover layer having a refractive index nr1, and formed between a surface of the optical recording medium where light is incident and the first information recording surface closest to the medium surface; a first intermediate layer having a refractive index nr2, and formed between the first information recording surface and the second information recording surface second closest to the medium surface; and a second intermediate layer having a refractive index nr3, and formed between the second information recording surface and the third information recording surface third closest to the medium surface, wherein shape-wise thicknesses tr1, tr2, and tr3 of the cover layer, the first intermediate layer, and the second intermediate layer are respectively determined depending on the refractive indexes nr1, nr2, and nr3, referring to a spherical aberration, the thicknesses tr1, tr2, and tr3 are respectively converted into thicknesses t1, t2, and t3 of the respective layers having a predetermined refractive index "no", referring to a defocus amount, the thicknesses tr1, tr2, and tr3 are calculated by products of the thicknesses t1, t2, and t3, and a function g(n) expressed by the following formula (22) to set the thicknesses t1, t2, and t3 in such a range that the spherical aberration lies in a predetermined range, the thicknesses t1, t2, and t3 are calculated by products of a function f(n) expressed by the following formula (23), and the calculated thicknesses tr1, tr2, and tr3, and the re-calculated thicknesses t1, t2, and t3 satisfy the following formula (24):

$$g(n)=-1.1111nr^3+5.8143nr^2-9.8808nr+6.476 \quad (22)$$

$$f(n)=-1.088nr^3+6.1027nr^2-12.042nr+9.1007 \quad (23)$$

$$|t1-(t2+t3)| \geq 1 \text{ μm} \quad (24)$$

in the formulas (22) and (23), n=nr1, nr2, and nr3.

According to the above arrangement, the optical recording medium includes a cover layer having a refractive index nr1, and formed between a surface of the optical recording medium where light is incident and the first information recording surface closest to the medium surface; a first intermediate layer having a refractive index nr2, and formed between the first information recording surface and the second information recording surface second closest to the medium surface; and a second intermediate layer having a refractive index nr3, and formed between the second information recording surface and the third information recording surface third closest to the medium surface. Shape-wise thicknesses tr1, tr2, and tr3 of the cover layer, the first intermediate layer, and the second intermediate layer are respectively determined depending on the refractive indexes nr1, nr2, and nr3, referring to a spherical aberration. The thicknesses tr1, tr2, and tr3 are respectively converted into thicknesses t1, t2, and t3 of the respective layers having a predetermined refractive index "no", referring to a defocus amount. The thicknesses tr1, tr2, and tr3 are calculated by products of the thicknesses t1, t2, and t3, and the function g(n) expressed by the above-described formula (22) to set the thicknesses t1, t2, and t3 in such a range that the spherical aberration lies in a predetermined range. Thereafter, the thicknesses t1, t2, and t3 are calculated by products of the function f(n) expressed by the above-described formula (23), and the calculated thicknesses tr1, tr2, and tr3, and the re-calculated thicknesses t1, t2, and t3 satisfy the above-described formula (24).

As described above, since the thicknesses t1, t2, t3, and t4 obtained by conversion from the shape-wise thicknesses tr1, tr2, and tr3 of the cover layer, the first intermediate layer, and the second intermediate layer satisfy the relation: |t1−(t2+t3)| ≧ 1 μm, it is possible to prevent light from forming an image on the backside of the surface of the optical recording medium, and suppress coherence between reflected light from the information recording surfaces to thereby improve the quality of a servo signal and a reproduction signal. Further, since the distance between the surface of the optical recording medium, and the information recording surface closest to the surface of the optical recording medium can be set to a large value, deterioration of a reproduction signal in the case where there is a damage or a smear on the surface of the optical recording medium can be suppressed.

An optical information device according to another aspect of the invention is an optical information device for reproducing or recording information with respect to the optical recording medium having any one of the above arrangements, wherein the optical information device moves a light spot of laser light to be irradiated onto the optical recording medium from a predetermined information recording surface to another information recording surface of the plurality of the information recording surfaces to thereby reproduce or record information with respect to the plurality of the information recording surfaces. According to this arrangement, a light spot of laser light to be irradiated onto the optical recording medium is moved from a predetermined information recording surface to another information recording surface of the plurality of the information recording surfaces to thereby reproduce or record information with respect to the plurality of the information recording surfaces.

An information reproducing method according to yet another aspect of the invention is an information reproducing method for reproducing information from the optical recording medium having any one of the above arrangements. The information reproducing method includes a step of converging a light spot of laser light onto a predetermined information recording surface of the plurality of information recording surfaces; a step of reproducing information from the predetermined information recording surface; and a step of moving the light spot of laser light from the predetermined information recording surface to another information recording surface of the optical recording medium different from the predetermined information recording surface to thereby reproduce information from the another information recording surface, in the case where the information is reproduced from the another information recording surface.

According to the above arrangement, a light spot of laser light is converged onto a predetermined information recording surface of the plurality of information recording surfaces to reproduce information from the predetermined information recording surface. Further, in the case where information is reproduced from another information recording surface of the optical recording medium different from the predetermined information recording surface, the light spot of laser light is moved from the predetermined information recording surface to the another information recording surface to reproduce the information from the another information recording surface.

The embodiments or the examples described in the detailed description of the invention are provided to clarify the technical contents of the invention. The invention should not be construed to be limited to the embodiments or the examples.

The invention may be modified in various ways as far as such modifications do not depart from the spirit and the scope of the invention hereinafter defined.

The inventive multilayer optical disc (the inventive optical recording medium), the inventive optical recording medium manufacturing method, the inventive optical information device, and the inventive information reproducing method enable to maximally suppress an influence of reflected light from an information recording surface other than a targeted information recording surface at the time of reproducing from the targeted information recording surface, even if the refractive indexes of the cover layer and the intermediate layer are different from the standard value, to thereby reduce an influence on a servo signal and a reproduction signal to be used in an optical head device. Thus, the invention is useful to an optical recording medium for information recording or reproducing by irradiated light, a manufacturing method for the optical recording medium, an optical information device for recording or reproducing information with respect to the optical recording medium, and an information reproducing method for reproducing information from the optical recording medium.

Thus, the invention provides an optical recording medium capable of securing a reproduction signal of good quality, having a large capacity, and having compatibility with an existing optical recording medium.

The invention claimed is:

1. A manufacturing method for an optical recording medium having N (where N is a positive integer of 3 or more) information recording surfaces, actual thicknesses of a cover layer and first through (N−1)-th intermediate layers of the optical recording medium having refractive indexes nr1, nr2, . . . , and nrN being respectively tr1, tr2, . . . , and trN in an order from a surface of the optical recording medium where light is incident, the manufacturing method comprising:

converting the thicknesses tr1, tr2, . . . , and trN into thicknesses t1, t2, . . . , and tN of layers having a predetermined standard refractive index "no" which makes a defocus value equal to a defocus value of the actual thicknesses tr1, tr2, . . . , and trN;

setting the refractive index "no" to 1.60;

setting the thicknesses t1, t2, . . . , and tN each to 10 μm or more;

setting a difference DFF between a sum of a thickness "ti" through a thickness "tj", and a sum of a thickness "tk" through a thickness "tm" to 1 μm or more (where i, j, k, and m are each any positive integer satisfying i≦j<k≦m≦N); and calculating the thicknesses t1, t2, . . . , and tN by products of a function f(n) expressed by the following formula (1), and the thicknesses tr1, tr2, . . . , and trN:

$$f(n)=-1.088n^3+6.1027n^2-12.042n+9.1007 \quad (1)$$

in the formula (1), n=nr1, nr2, . . . , and nrN, wherein the manufacturing method produces the optical recording medium with layers having thicknesses that prevent light from forming an image on a backside of a surface of the optical recording medium, suppress coherence between reflected light from the information recording surfaces, and improve the quality of a servo signal and a reproduction signal.

2. An optical information device for reproducing or recording information with respect to an optical recording medium manufactured by a manufacturing method for the optical recording medium, the optical recording medium having N (where N is a positive integer of 3 or more) information recording surfaces, actual thicknesses of a cover layer and first through (N-1)-th intermediate layers of the optical recording medium having refractive indexes nr1, nr2, ..., and nrN being respectively tr1, tr2, ..., and trN in an order from a surface of the optical recording medium where light is incident, the optical information device, comprising:

an optical head device that moves a light spot of laser light that is to irradiate the optical recording medium from a predetermined information recording surface to another information recording surface of a plurality of the information recording surfaces to thereby reproduce or record information with respect to the plurality of the information recording surfaces, wherein the manufacturing method for the optical recording medium includes:

converting the thicknesses tr1, tr2, ..., and trN into thicknesses t1, t2, ..., and tN of layers having a predetermined standard refractive index "no" which makes a defocus value equal to a defocus value of the actual thicknesses tr1, tr2, ..., and trN;

setting the refractive index "no" to 1.60;

setting the thickness tr1, tr2, ..., and tN each to 10 μm or more;

setting a difference DFF between a sum of a thickness "ti" through a thickness "tj", and a sum of a thickness "tk" through a thickness "tm" to 1 μm or more (where i, j, k, and m are each any positive integer satisfying j≦k≦m≦N); and calculating the thickness t1, t2, ..., and tN by products of a function f(n) expressed by the following formula (1), and the thickness tr1, tr2, ..., and trN:

$$f(n)=-1.088n^3+6.1027n^2-12.042n+9.1007 \quad (1)$$

in the formula (1), n=nr1, nr2, ..., and nrN.

wherein the manufacturing method produces the optical recording medium with layers having thicknesses that prevent light from forming an image on a backside of a surface of the optical recording medium, suppress coherence between reflected light from the information recording surfaces, and improve the quality of a servo signal and a reproduction signal.

3. An information reproducing method for reproducing information from an optical recording medium manufactured according to a manufacturing method for the optical recording medium, the optical recording medium having N (where N is a positive integer of 3 or more) information recording surfaces, actual thicknesses of a cover layer and first through (N-1)-th intermediate layers of the optical recording medium having refractive indexes nr1, nr2, ..., and nrN being respectively tr1, tr2, ..., and trN in an order from a surface of the optical recoring medium where light is incident, and the manufacturing method for the optical recording medium including the steps of:

converting the thicknesses tr1, tr2, ..., abd trN into thicknesses t1, t2, ..., and tN of layers having a predetermined standard refractive index "no" which makes a defocus value equal to a defocus value of the actual thicknesses tr1, tr2, ... and trN;

setting the refractive index "no" to 1.60;

setting the thickness t1, t2, ..., and tN each to 10 μm or more;

setting a difference DFF between a sum of a thickness "ti" through a thickness "tj", and a sum of a thickness "tk" through a thickness "tm" to 1 μm or more (where i, j, k, and m are each any positive integer satisfying i≦j≦k≦m≦N); and calculating the thicknesses t1, t2, ..., and tN by products of a function f(n) expressed by the following formula (1), and the thicknesses tr1, tr2, ..., and trN:

$$f(n)=1.088n^3+6.1027n^2-12.042n+9.1007 \quad (1)$$

in the formula (1), n=nr1, nr2, ..., and nrN, wherein the manufacturing method produces the optical recording medium with layers having thicknesses that prevent light from forming an image on a backside of a surface of the optical recording medium, suppress coherence between reflected light from the information recording surfaces, and improve the quality of a servo signal and a reproduction signal, the information reproducing method comprising:

converging a light spot of laser light onto a predetermined information recording surface of a plurality of information recording surfaces;

reproducing information from the predetermined information recording surface; and moving the light spot of laser light from the predetermined information recording surface to another information recording surface of the optical recording medium different from the predetermined information recording surface to thereby reproduce information from the another information recording surface, in the case where the information is reproduced from the another information recording surface.

* * * * *